(12) United States Patent
Aissi et al.

(10) Patent No.: US 9,495,544 B2
(45) Date of Patent: Nov. 15, 2016

(54) SECURE DATA TRANSMISSION AND VERIFICATION WITH UNTRUSTED COMPUTING DEVICES

(71) Applicant: Visa International Service Association, San Francisco, CA (US)

(72) Inventors: Selim Aissi, Menlo Park, CA (US); Taeho Kgil, Foster City, CA (US); Gyan Prakash, Foster City, CA (US)

(73) Assignee: Visa International Service Association, San Francisco, CA (US)

( * ) Notice: Subject to any disclaimer, the term of this patent is extended or adjusted under 35 U.S.C. 154(b) by 82 days.

(21) Appl. No.: 14/318,266

(22) Filed: Jun. 27, 2014

(65) Prior Publication Data

US 2015/0007265 A1 Jan. 1, 2015

Related U.S. Application Data

(60) Provisional application No. 61/840,340, filed on Jun. 27, 2013.

(51) Int. Cl.
*G06F 7/04* (2006.01)
*G06F 15/16* (2006.01)
(Continued)

(52) U.S. Cl.
CPC ............... *G06F 21/60* (2013.01); *G06F 7/58* (2013.01); *G06F 21/602* (2013.01);
(Continued)

(58) Field of Classification Search
CPC ..................................................... G06F 21/60
(Continued)

(56) References Cited

U.S. PATENT DOCUMENTS 5,968,141 A 10/1999 Tsai
6,687,721 B1 2/2004 Wells et al.
(Continued)

FOREIGN PATENT DOCUMENTS

EP 2595423 A1 5/2013
WO 2012/135192 A2 10/2012

OTHER PUBLICATIONS

Arvind Seshadri et al., "Pioneer: Verifying Code Integrity and Enforcing Untampered Code Execution on Legacy Systems", SOSP'05, Oct. 23-26, 2005, 16 pages.
(Continued)

*Primary Examiner* — Dant Shaifer Harriman
(74) *Attorney, Agent, or Firm* — Kilpatrick Townsend & Stockton LLP

(57) ABSTRACT

Techniques from the proposed invention relate to providing enhanced security. For example, techniques described herein allow a computer system, such as a mobile device, to support a wide variety of security functions and security sensitive applications on a mobile device by providing enhanced security via secure input and output data transmission and verification through a secure module. The secure module may cause user interfaces to be provided to users by providing obfuscated user interface data to the operating system that do not reveal elements that are part of the user interfaces. The secure module may receive obfuscated user input values representing user input values, and de-obfuscate these user input values, whereby the actual input values are not exposed to the underlying operating system. The secure module may track the flow of user input/output data through the computing device to ensure the integrity and authenticity of this data.

21 Claims, 9 Drawing Sheets

(51) Int. Cl.
   *G06F 17/30* (2006.01)
   *H04L 29/06* (2006.01)
   *G06F 21/60* (2013.01)
   *H04L 9/08* (2006.01)
   *H04W 12/04* (2009.01)
   *H04L 9/32* (2006.01)
   *G06F 7/58* (2006.01)

(52) U.S. Cl.
   CPC ........... *H04L 9/0866* (2013.01); *H04L 9/0869* (2013.01); *H04L 9/3278* (2013.01); *H04L 63/08* (2013.01); *H04W 12/04* (2013.01); *H04L 2209/56* (2013.01)

(58) Field of Classification Search
   USPC .......................................................... 726/3
   See application file for complete search history.

(56) References Cited

U.S. PATENT DOCUMENTS

| | | |
|---|---|---|
| 6,816,900 B1 | 11/2004 | Vogel et al. |
| 7,752,616 B2 | 7/2010 | Marolia et al. |
| 7,926,087 B1 * | 4/2011 | Holl, II ............... H04L 67/1097 726/3 |
| 8,391,834 B2 | 3/2013 | Raleigh |
| 8,438,631 B1 | 5/2013 | Taylor et al. |
| 8,578,361 B2 | 11/2013 | Cassapakis et al. |
| 8,583,920 B1 | 11/2013 | Bursell |
| 8,589,557 B1 | 11/2013 | Labat et al. |
| 8,607,208 B1 | 12/2013 | Arnold et al. |
| 8,613,080 B2 | 12/2013 | Wysopal et al. |
| 8,635,272 B2 | 1/2014 | Reisman |
| 2002/0178370 A1 | 11/2002 | Gurevich et al. |
| 2004/0039762 A1 | 2/2004 | Hars |
| 2005/0221766 A1 | 10/2005 | Brizek et al. |
| 2006/0026687 A1 | 2/2006 | Peikari |
| 2006/0070066 A1 | 3/2006 | Grobman |
| 2006/0150254 A1 | 7/2006 | Siukonen |
| 2007/0118880 A1 | 5/2007 | Mauro, II |
| 2008/0276298 A1 | 11/2008 | Leterrier et al. |
| 2009/0006854 A1 | 1/2009 | Alkove et al. |
| 2009/0165086 A1 | 6/2009 | Trichina et al. |
| 2009/0307705 A1 | 12/2009 | Bogner |
| 2010/0011116 A1 | 1/2010 | Thornton et al. |
| 2010/0269152 A1 * | 10/2010 | Pahlavan ............. G06F 9/4445 726/3 |
| 2011/0264905 A1 | 10/2011 | Ovsiannikov |
| 2012/0015644 A1 | 1/2012 | Danford et al. |
| 2012/0079282 A1 * | 3/2012 | Lowenstein ............ G06F 21/83 713/189 |
| 2012/0084184 A1 | 4/2012 | Raleigh et al. |
| 2012/0102307 A1 | 4/2012 | Wong |
| 2013/0086136 A1 | 4/2013 | Inglett et al. |
| 2013/0111597 A1 * | 5/2013 | Gossweiler, III ...... G06F 21/556 726/26 |
| 2013/0347064 A1 | 12/2013 | Aissi |
| 2014/0033323 A1 | 1/2014 | Moroney et al. |
| 2014/0040338 A1 | 2/2014 | Van Der Sluis et al. |
| 2014/0214687 A1 * | 7/2014 | Huxham ................ H04L 63/10 705/70 |

OTHER PUBLICATIONS

Andrew Regenscheid, "Roots of Trust in Mobile Devices", ISPAB, Feb. 2012, 5 pages.

Office Action mailed Aug. 7, 2015 in U.S. Appl. No. 14/318,070, 16 pages.

* cited by examiner

700

```
┌─────────────────────────────────────────────────────────────────────────┐
│ GENERATE "MEASURED VALUE" INFORMATION FOR USER INPUT THAT IDENTIFIES     │
│ ONE OR MORE SOFTWARE OR HARDWARE MODULES INVOLVED IN RECEIVING OR        │
│ TRANSFORMING THE USER INPUT PRIOR TO IT BEING PRESENTED TO THE SECURE    │
│ MODULE 545                                                               │
│  ┌───────────────────────────────────────────────────────────────────┐  │
│  │ THE "MEASURED VALUE" INFORMATION FURTHER IDENTIFIES, FOR AT LEAST │  │
│  │ ONE OF THE ONE OR MORE SOFTWARE OR HARDWARE MODULES, AN INPUT     │  │
│  │ VALUE PROVIDED TO THAT MODULE AND AN OUTPUT VALUE GENERATED BY    │  │
│  │ THAT MODULE 720                                                   │  │
│  └───────────────────────────────────────────────────────────────────┘  │
└─────────────────────────────────────────────────────────────────────────┘
                                    │
                                    ▼
┌─────────────────────────────────────────────────────────────────────────┐
│ SEND A MESSAGE INCLUDING THE DE-OBFUSCATED USER INPUT AND THE            │
│ "MEASURED VALUE" INFORMATION TO AN AUTHENTICATION MODULE FOR ANALYSIS 705│
│  ┌───────────────────────────────────────────────────────────────────┐  │
│  │ USE SOFTWARE-ONLY ENCRYPTION STACK TERMINATING WITHIN THE SECURE  │  │
│  │ MODULE TO GENERATE A SECURE TUNNEL WITH A SERVER COMPUTING DEVICE │  │
│  │ EXECUTING THE AUTHENTICATION MODULE 710                           │  │
│  └───────────────────────────────────────────────────────────────────┘  │
│  ┌───────────────────────────────────────────────────────────────────┐  │
│  │ SEND THE MESSAGE TO THE VERIFICATION MODULE VIA THE GENERATED     │  │
│  │ SECURE TUNNEL 715                                                 │  │
│  │  ┌─────────────────────────────────────────────────────────────┐  │  │
│  │  │ ENCRYPT THE MESSAGE USING AN ENCRYPTION KEY NEGOTIATED      │  │  │
│  │  │ BETWEEN THE SECURITY MODULE AND THE SERVER COMPUTING        │  │  │
│  │  │ DEVICE 720                                                  │  │  │
│  │  └─────────────────────────────────────────────────────────────┘  │  │
│  │  ┌─────────────────────────────────────────────────────────────┐  │  │
│  │  │ INSTRUCT THE UNDERLYING O/S TO SEND THE ENCRYPTED MESSAGE   │  │  │
│  │  │ [WHEREIN THE ENCRYPTED MESSAGE IS SENT WITHIN AN            │  │  │
│  │  │ APPLICATION LAYER OF AN INTERNET PROTOCOL MESSAGE]          │  │  │
│  │  │ [WHEREIN THE ENCRYPTED MESSAGE WITHIN THE APPLICATION LAYER │  │  │
│  │  │ IS FURTHER ENCRYPTED BY THE UNDERLYING O/S USING ANOTHER    │  │  │
│  │  │ ENCRYPTION KEY NEGOTIATED BETWEEN THE UNDERLYING O/S AND    │  │  │
│  │  │ THE SERVER COMPUTING DEVICE] 725                            │  │  │
│  │  └─────────────────────────────────────────────────────────────┘  │  │
│  └───────────────────────────────────────────────────────────────────┘  │
└─────────────────────────────────────────────────────────────────────────┘
                                    │
                                    ▼
┌ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐
│ RECEIVE, FROM THE SERVER COMPUTING DEVICE, A RESPONSE MESSAGE           │
│ INDICATING A RESULT OF THE AUTHENTICATION MODULE ATTEMPTING TO VERIFY   │
│ THE USER INPUT BASED UPON THE "MEASURED VALUE" INFORMATION 730          │
└ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘
```

*FIG. 7*

SECURE DATA TRANSMISSION AND VERIFICATION WITH UNTRUSTED COMPUTING DEVICES

CROSS REFERENCE TO RELATED APPLICATIONS

This application is a non-provisional application and claims the benefit of priority of U.S. Provisional Application No. 61/840,340 titled "SECURE CONTAINER," and filed on Jun. 27, 2013, which is herein incorporated by reference in its entirety for all purposes.

BACKGROUND

Aspects of the disclosure relate to computing technologies. In particular, aspects of the disclosure relate to mobile computing device technologies, such as systems, methods, apparatuses, and computer-readable media for providing enhanced security via secure data transmission and verification with untrusted computing devices.

Mobile devices are becoming increasing prevalent, and consumers are performing more and more security sensitive tasks by installing security sensitive applications from online application stores. However, the variation of support for security functionality between any two devices is too large for rapid development and secure deployment of security sensitive applications. For example, in a "bring your own device" environment, a single corporation many have its employees utilizing huge numbers of variations of computing hardware, operating systems, applications, and security hooks.

The significant variations in the operating environments for the various devices leads to development of applications that use the least common denominator in terms of security features offered by a combination of hardware and operating system resources in the various operating environments. However, in many instances the device itself does not support the security functions desired by the application, thus reducing the options available for running the application securely, which can lead to an inability to use the security sensitive application on the device at all. Thus, although the use of mobile devices for performing security sensitive tasks has continued to climb, such uses are inherently risky and insecure.

Embodiments of the invention address these and other problems, individually and collectively.

BRIEF SUMMARY

Systems, methods, apparatuses, and computer-readable media are described for enabling secure data transmission and verification with untrusted computing devices. Techniques described herein allow a computer system, such as a mobile device, to support a wide variety of security functions and security sensitive applications on a mobile device by implementing a secure module that can generate user interfaces and receive user inputs without revealing the true content of this data to an underlying, untrusted operating system. The secure module may also track measured value data representing the flow of user interface data and user input data through the untrusted computing device, to thereby note which modules process this data, the order of the processing, as well as the inputs provided to and the outputs resulting from these modules. With this measured value data, the processing of the user interface data and/or the user input data may be authenticated/verified as genuine and thus, the integrity of the untrusted device may be determined as well.

According to an embodiment, a method in a secure module executing on a computing device above an operating system includes causing, by the secure module, a user interface to be presented to a user by providing obfuscated user interface data to the operating system that does not reveal meaningful elements that are part of the user interface. The method also includes receiving, by the secure module from the operating system, a notification that the user has provided an input value via the user interface to the computing device. The notification does not include the input value and the operating system is unaware of the input value. The method also includes, responsive to said receiving the notification, identifying an obfuscated user input value that represents the input value, and de-obfuscating, by the secure module, the obfuscated user input value to yield the input value.

According to an embodiment, a non-transitory computer-readable storage medium stores instructions that, when executed by one or more processors of a computing device, cause the computing device to execute a secure module above an operating system and perform operations. The operations include causing, by the secure module, a user interface to be presented to a user by providing obfuscated user interface data to the operating system that does not reveal meaningful elements that are part of the user interface. The operations also include receiving, by the secure module from the operating system, a notification that the user has provided an input value via the user interface to the computing device. The notification does not include the input value and the operating system is not aware of the input value. The operations also include, responsive to said receiving the notification, identifying an obfuscated user input value that represents the input value, and de-obfuscating, by the secure module, the obfuscated user input value to yield the input value.

According to an embodiment, a computing device is described that includes one or more processors, a user-input hardware interface coupled to the one or more processors, and a non-transitory computer readable storage medium coupled to the one or more processors. The non-transitory computer readable storage medium stores instructions that, when executed by the one or more processors, cause the computing device to execute a secure module above an operating system and perform operations. The operations include causing, by the secure module, a user interface to be presented to a user by providing obfuscated user interface data to the operating system that does not reveal meaningful elements that are part of the user interface. The operations also include receiving, by the secure module from the operating system, a notification that the user has provided an input value to the computing device via the user-input hardware interface. The notification does not include the input value and the operating system is not aware of the input value. The operations also include, responsive to said receiving the notification, identifying an obfuscated user input value that represents the input value, and de-obfuscating, by the secure module, the obfuscated user input value to yield the input value.

According to some embodiments, a secure module executing on a computing device above an operating system generates a secure connection with a server computing device over another connection between the computing device and the server computing device. The secure connection terminates within the secure module, and the another connection terminates outside of the secure module. Thus, in some embodiments, the secure module is able to securely communicate with external computing devices despite relying upon an untrusted operating system and/or untrusted hardware. In some embodiments, the server computing device maintains control over the secure tunnel. For example, in some embodiments the server computing device utilizes heartbeat messages and/or timers to determine when to terminate the secure tunnel, which may prompt a generation of a new secure tunnel.

According to an embodiment, a method in a secure module executing on a computing device above an operating system includes receiving, at the secure module, an obfuscated user input value generated responsive to a user providing an input value to the computing device. The obfuscated user input value does not reveal the input value. The method also includes de-obfuscating, by the secure module, the obfuscated user input value to yield the input value. The method further includes receiving, by the secure module, one or more notifications that the input value provided to the computing device by the user has been processed by one or more respective software or hardware modules of the computing device. The method also includes updating, by the secure module, a measured value for information flow tracking in response to the one or more notifications. The measured value identifies the one or more software or hardware modules that have processed the input value.

Embodiments of the invention thus enable the input and output of data between an application and a user (or a server) to be trusted and verifiable by limiting the exposure of this data to an underlying operating system that may be compromised. Thus, even when a computing device is compromised (e.g., has spyware, a virus, malware, defects, or flaws in the operating system, other software, and/or hardware), in some embodiments the input and output of data at the computing device (or between the computing device and another computing device) may still be verified as being accurate (i.e., correct, uncontaminated, or unperturbed).

The foregoing has broadly outlined some features and technical advantages of examples according to the disclosure in order for the detailed description that follows to be better understood. Additional features and advantages will be described hereinafter. The conception and specific examples disclosed can be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages, will be better understood from the following description when considered in connection with the accompanying figures. Each of the figures is provided for the purpose of illustration and description only and not as a definition of the limits of the claims.

BRIEF DESCRIPTION OF THE DRAWINGS

FIG. 7 illustrates a method for generating and transmitting measured value verification data using a secure tunnel between a secure module executing on an untrusted computing device and an external authentication module according to an embodiment of the invention.

DETAILED DESCRIPTION

Figure 1:
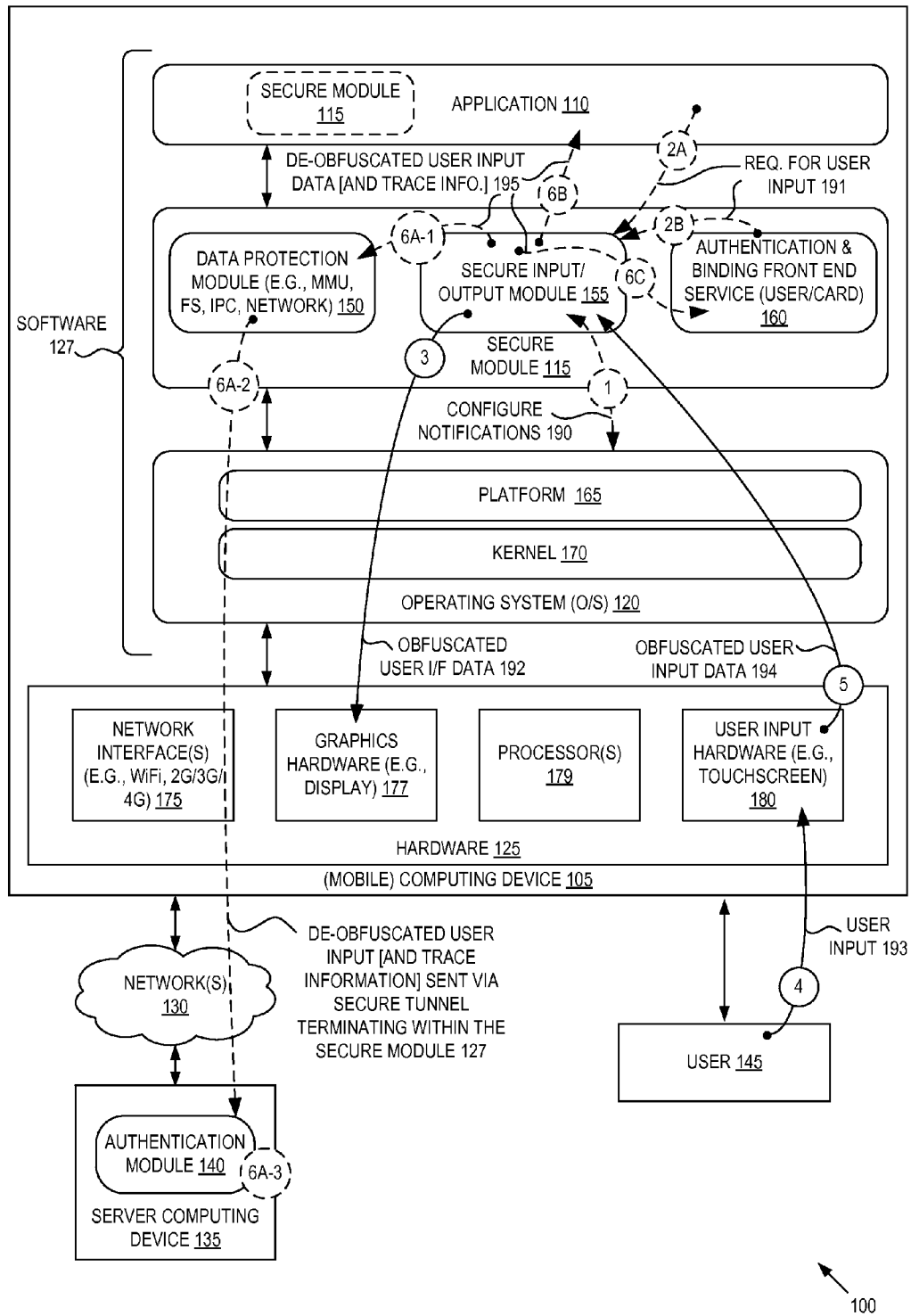
FIG. 1 illustrates a block diagram of a system providing secure data transmission with an untrusted computing device according to an embodiment of the invention.

Systems, methods, apparatuses, and computer-readable media are described for secure data transmission and verification with untrusted computing devices. According to some embodiments, a secure module generates user interfaces using obfuscated data that obscures the true content of the user interfaces from an underlying operating system or hardware, which may be compromised. In some embodiments, the secure module receives user input from a user in the form of obfuscated user input that similarly obscures the true input provided by the user from the underlying operating system or hardware. Moreover, in some embodiments the secure module is able to perform information flow tracking (e.g., observe and track the movement and/or processing of data) for user interface data between the secure module and the display hardware, and in some embodiments the secure module is able to perform information flow tracking for user input data provided by the user as it flows from the hardware, possibly through the operating system or other software modules, and to the secure module. Thus, the information flow tracking may be end-to-end. The secure module, by noting the path of this data and how it is transformed en route, is able to collect a set of information allowing for verification that the data was appropriately transformed as it moved through the untrusted computing device. Thus, according to some embodiments, the secure module, upon de-obfuscating the obfuscated user input it acquires, may utilize a secure tunnel that terminates within the secure module to avoid exposing the data to the untrusted operating system and/or hardware, to transmit to an authentication module the de-obfuscated user input and, in some embodiments, measured value data indicating the path of the user input through the computing system along with how the user input may have changed during this route. The authentication module may then, based upon analyzing the measured value data, determine whether the user input—and possibly the user providing the input (e.g., such as when the user input comprises user authentication data such as a password or PIN)—is authentic.

Accordingly, embodiments of the invention allow for the input and output of data between an application and a user (or a server) to be trusted and verifiable by limiting the exposure of this data to an underlying operating system and/or hardware that may be compromised. Thus, even when a computing device is compromised (e.g., has spyware, a virus, malware, defects, or flaws in the operating system, other software, and/or hardware), in some embodiments the input and output of data at the computing device (or between the computing device and another computing device) may be verified as being accurate (i.e., correct, uncontaminated, or unperturbed) through the use of integrity measures.

Thus, embodiments of the invention provide end-to-end security between the secure module and the user by maintaining measured value data, which represents "tagged" metadata indicating the hardware and/or software modules that have processed (or otherwise "touched" or transformed) user interface data and/or user input data. In some embodiments, this measured value data may be presented along with the user input data as a way to show a level of authenticity of the user input, as the state of the computing device at the time of the data acquisition/processing is thus preserved. Accordingly, the integrity and authenticity of user input can be ensured by determining that it has not been spoofed.

I. Terminology

Prior to discussing embodiments of the invention, a description of some terminology is presented to assist with understanding this disclosure.

As used herein, a "mobile device" may comprise any electronic and/or communication device that may be transported and operated by a user, which may also provide remote communication capabilities with resources coupled to one or more networks. Examples of mobile devices include mobile phones (e.g. cellular phones), personal digital assistants (PDAs), tablet computers, net books, laptop computers, personal music players, hand-held electronic reading devices, wearable computing devices, etc.

A "server computer" may be a powerful computer or cluster of two or more computers. For example, the server computer can be a large mainframe, a minicomputer cluster, or a group of servers functioning as a unit. In one example, the server computer may be a database server coupled to a web server. Server computers often execute server applications that act as a server in client-server interactions, including but not limited to database server applications, web server applications, application server applications, etc.

A "user" may be an entity, such as, an individual that may be associated with one or more payment accounts and/or mobile devices. The user may request different levels of security desired by the user or directly configure a threshold or level of entropy that the user desires for specific cryptographic operations.

A "trusted execution environment" (TEE) may be a secure environment on the computing device for securely executing an application. A trusted execution environment may be supported in software, hardware, firmware or a combination thereof. The trusted execution environment may be implemented so that its execution and data space are isolated from other environments executing code on the computing device. For example, the trusted execution environment may have dedicated or protected processing and system resources, such as secure storage and protected memory buffers. In some implementations, a trusted execution environment may have paging structures, exception handlers, protected memory regions and hardware resources dedicated or associated with the trusted execution environment. A trusted execution environment is not limited to but may be implemented using one or more trusted execution environments that may include a secure element, SIM/UICC card, or virtualization technology.

A "hashing mechanism" may refer to the use of a hashing function that can be used to map data of arbitrary size to data of fixed size, with slight differences in input data producing very big differences in output data. The values returned by a hash function are called hash values, hash codes, hash sums, or simply hashes. Hash functions are widely used to generate fixed-length output data. Well known examples of hashing mechanisms include, but are not limited to, SHA-1 (Secure Hash Algorithm-1) and SHA-256 (Secure Hash Algorithm-256) and Message Digest (MD). Hash functions are often one-way functions that are easy to compute for every possible input, but hard to invert, in terms of computational complexity.

An "operating system" (OS or/OS) may be a collection of software that manages computer hardware resources and provides common services for applications. The operating system is a vital component of the system software in a computer system. Applications usually require an operating system to function, as the operating system manages most—but not necessarily all—access to hardware resources by applications.

A "network stack" may be a software and/or hardware implementation of one or more networking protocols used for communicating between any two devices. In some implementations, the operating system implements one or more network stacks for communicating with a network, wherein the network comprises of one or more computing devices. Many networking protocols are organized by the Open Systems Interconnection (OSI) model that characterizes and standardizes networking communication techniques into seven logical layers of abstraction. A network stack may be capable of communicating using a variety of wired and wireless protocols, such as TCP, UDP, IP, ICMP, ATM, SSL, TLS, Ethernet, 3GPP, 3GPP2, CDMA, LTE, Bluetooth, NFC, PPP, etc.

A "security sensitive application" may include any application executing on a device that manages sensitive data associated with the user, such as a payment account. Sensitive data may include sensitive information, such as Personal Account Information (PAI) and Personal Identifying Information (PII). Examples of PAI data may include account numbers, such as Personal Account Numbers (PAN) associated with a payment device. Example of PII data may include social security numbers, names, birth dates, etc.

A "secure communication channel" may be a networking channel between two entities, such as a server computer and mobile device, that may allow the two entities to communicate with each other through a secure channel without a significant likelihood of eavesdropping by a third entity, spoofing of the communication by a third entity, or masquerading of the third entity as one of the two expected entities participating in the secure communication. Setting up a secure communication channel allows sensitive information such as credit card numbers, social security numbers, login credentials and signaling information for managing the trusted execution environment to be transmitted securely between the two entities. Known techniques, such as secure socket layer (SSL) or transport layer security (TLS) protocols may be used in establishing a secure communication channel.

A "virtualized environment" may provide isolation between different operating environments sharing the same physical resources. In other words, a virtualized environment provides a logical abstraction of computing resources from physical constraints. One common abstraction is referred to as a virtual machine ("VM", also known as a guest), which provides the content running in the VM a direct interface to the physical hardware while maintaining the abstraction. Virtualization technology allows multiple VMs running on the same physical hardware to operate independently and isolated from each other. The one or more VMs on the system are managed by a Virtualized Machine Monitor, or VMM (also known as hypervisor or host). The VMM is a software or firmware layer responsible for hosting and managing virtual machines. The VMM manages the system's processor, memory, and allocates other resources for each VM.

"Virtualization events" may refer to events on a system that may occur while operating a virtualized environment. In some instances, virtualization events may be transition events that may cause the operating state of the processing entity to transition from the virtual machine monitor to the virtual machine or vice versa. Examples of virtualization events may include VMexits and VMenters. VMexits and VMenters mark the transition of the execution between the VMM and the VM. Virtualization events may result from system interrupts, exceptions, accessing of privileged resources from an unprivileged environment, etc.

"Cloud computing" or just "the Cloud" may refer to use of computing resources (hardware and/or software) that are available in a remote location (with respect to an end user, for example) and accessible using network resources. Hardware and software resources may include, but are not limited to, one or more server computers, databases, routers/switches, operating systems, and applications. In some implementations, users are able to acquire the use of these computing resources (including storage and computing power, for example) as a utility on demand.

A "payment processing network" may include data processing subsystems, networks, and operations used to support and deliver certificate authority services, authorization services, exception file services, and clearing and settlement services. An exemplary payment processing network may include VisaNet™. Payment processing networks such as VisaNet™ are able to process credit card transactions, debit card transactions, and other types of commercial transactions. In some implementations, the payment processing network may securely interact with the RNG/PUF system resident on the mobile device using a secure communication channel for providing a robust source of entropy. The payment processing network may include a server computer. The payment processing network may use any suitable wired or wireless network, including the Internet.

A "mobile operating network" may be a radio network distributed over land areas called cells, each served by at least one fixed-location transceiver, known as a cell site or base station. When joined together these cells may provide radio coverage over a wide geographic area. This enables a large number of mobile devices to communicate with each other and with fixed devices anywhere in the network, via base stations.

As used herein, the term "obfuscated data" refers to data that represents original data but in some way hides a true meaning of the original data. Thus, data obfuscation is a form of data masking where original data is purposely scrambled to prevent unauthorized access to that original data. For example, obfuscated data may be an encrypted version of some original data, or a result of the original data being transformed into another data type. As an example, a description of a user interface—which may describe user input elements, colors, lines, shapes, text, etc.—may be transformed into "obfuscated data" by creating a representation of the user interface that defines the pixel values (e.g., coordinates, colors, luminosity values, etc.). Similarly, a user selecting an "Enter" button in a user interface may be represented as "obfuscated data" as a user input location or coordinate within a user interface—absent knowledge of what elements are at that location, a mere coordinate is meaningless and thus obfuscated. As another example, obfuscated data may be a coordinate of an image (e.g., a Cartesian coordinate), and the original data may be the entity represented in the image at that location. Thus, the obfuscated data may be another form of the original data that can be used to generate a same result.

As used herein, the term "de-obfuscated data" refers to obfuscated data that has been changed, or translated, back to the value of the original data. De-obfuscation is a technique that may include executing an inverse of a function upon the obfuscated data (when the obfuscated data was created from the original data by an application of that function). For example, when an original datum (e.g., an integer) is obfuscated using a process that includes incrementing (i.e., adding) the integer by one, then the de-obfuscation of that obfuscated data may then include decrementing (i.e., subtracting) the integer by one. As another example, when an obfuscation technique includes an encryption of original data to yield the obfuscated data, the de-obfuscation may include decrypting the obfuscated data (with a same or different key as used during the encryption) to yield the original data. As another example, a de-obfuscation of a coordinate of an image may be a representation of what is in the image at that location identified by the coordinate.

II. Secure Module Architecture

Thus, the techniques described herein allow a computer system, such as a mobile device, to support a wide variety of security functions and security sensitive applications on a mobile device by implementing a secure module (also referred to as a "secure container"). The secure module provides a known state that can be trusted by local and remote applications that may not be able to establish trust in the mobile device otherwise. The secure module, in some embodiments, discovers and exposes security functionality and services to applications through a standardized interface, such as an application programming interface (API). Additionally, the secure module may also be configured to securely execute and update one or more portions of the secure container, create secure communication channels, implement random number generators, implement a robust and tamper resistant virtualized timer and counter, and dedicate hardware resources to the secure container.

The variation of support for security functionality between nearly any two devices has been too large for rapid development and secure deployment of security sensitive applications. In particular, the significant variations in the operating environments for the various devices has typically led to the development of applications that rely upon a "least common denominator" in terms of security features offered by a combination of hardware and operating system resources in the various operating environments. In many instances, the device itself does not support the security functions desired by the security application, reducing the options available to the application to running the application insecurely, implementing security algorithms in the application itself, or not installing or running the security sensitive application on the device at all. Such inconsistencies in support for security on mobile devices present a challenge in the widespread deployment of security sensitive applications such as payment applications that require a minimum level of security functionality and assurance on the mobile device.

Embodiments of the invention, as described herein, allow a computer system, such as a mobile device, to support a wide variety of security functions and security sensitive applications on a mobile device by implementing a secure module. In an embodiment, the secure module acts as a "sandbox" that provides a tightly controlled set of resources for guest programs to run on/in, such as scratch space on disk and memory. Additionally, the secure module may limit an application's access to files, preferences, network resources, and/or hardware. In some implementations, the secure module may also define a particular location (e.g., a directory) where the application and data related to the application may be stored.

In some embodiments of the invention, the secure module enumerates/discovers and exposes security functionality and services to applications through a standardized interface, such as an application programming interface (API). The secure module may further augment those capabilities with additional security functions to provide a unified interface for security sensitive applications. By implementing the secure module as a secure container, security sensitive applications (such as digital payment wallets or other payment applications, etc.) may thus securely run on a wide variety of devices (both feature-phones and smart phones), compensating for the deficiencies in the software and hardware capabilities of the device.

In one implementation, the secure module may be implemented using hardware assisted virtualization technology. Using virtualization technology to implement a secure container in software enables isolation of resources. In some embodiments, the virtualization technology is anchored in hardware, creating a robust implementation of a secure container. Intel® and AMD® processors provide hardware hooks that support virtualization technology. Qualcomm® also provides a software abstraction layer which enables multiple operating systems and other clients to execute concurrently on a single processor, through the virtualization and portioning of physical hardware resources.

Virtualization technology provides isolation between different operating environments sharing the same physical resources. In other words, virtualization provides a logical abstraction of computing resources from physical constraints. One common abstraction is referred to as a virtual machine (also known as guest), or VM, which provides the content running in the VM a direct interface to the physical hardware while maintaining the abstraction. Virtualization technology allows multiple VMs running on the same physical hardware to operate independently and isolated from each other. The one or more VMs on the system are managed by a Virtualized Machine Monitor, or VMM (also known as hypervisor or host). The VMM is a software or firmware layer responsible for hosting and managing virtual machines. The VMM manages the system's processor, memory, and allocates other resources for each VM. As discussed herein, a virtualized sandbox may refer to a secure module implemented using virtualization. Therefore, the terms virtualized sandbox and secure module may be used interchangeably without departing from the scope of the invention.

In other embodiments, the secure module may execute as a portion of another application. For example, the secure module may be a plugin, library, or Software Development Kit (SDK) that is combined with another application. In some embodiments, the secure module is a portion of a wallet application, and provides secure input and/or output (to a user, to a server computer, etc.) services for the wallet application.

FIG. 1 illustrates a block diagram of a system 100 providing secure data transmission with an untrusted computing device 105 according to an embodiment of the invention. In some embodiments, the untrusted computing device 105 is a mobile device such as a cellular phone, tablet, wearable computing device, laptop, or embedded computing device. The computing device 105, in this depicted embodiment, is directly used by a user 145 through graphics hardware 177 (such as a LED, LCD, or other display capable of displaying visual content) and/or user input hardware 180 such as touch screen circuitry. Of course, the user 145 may interact with the computing device 105 in other ways, including but not limited to issuing audio commands via a microphone of the computing device 105, using a mouse, keyboard, other input device, etc.

In the depicted embodiment, the computing device 105 includes both hardware 125 and, when executing, software 127. Of course, versions of the software 127 may also exist on one or more memories such as non-transitory computer readable storage media (not illustrated), even when the computing device 105 is not "on" or "executing." In some embodiments, the computing device 105 includes one or more physical network interfaces 175 (e.g., wired or wireless interfaces including IEEE 802.11 standard-adherent interfaces, cellular interfaces such as 2G (e.g., GSM, cdmaOne, PDC, iDEN, D-AMPS), 3G (e.g., UMTS, CDMA2000), 4G (e.g., WiMAX, LTE), 5G, etc.), graphics hardware 177, one or more processors 179 (including one or more of central processing units, ASICs, video processors, packet processors, etc.), and user input hardware 180. Of course, many other hardware components may exist within this computing device 105 that are known to those of skill in the art, but are not illustrated herein to avoid obscuring aspects of embodiments of the invention.

The software 127 of the computing device includes an operating system ("OS" or "O/S") 120 that comprises a kernel 170 and a platform 165. The kernel 170 has a primary function to manage the computing device's 105 hardware 125 and resources and allow other programs to run and use these resources. The platform 165 may include libraries, processes, applications, and other services offered as part of the O/S 120. In the depicted embodiment of FIG. 1, the software 127 also includes the secure module 115 and, optionally, an application 110 (which may, as detailed above, in some embodiments include the secure module 115 as an SDK or other plugin).

According to an embodiment of the invention, the secure module 115 includes a secure input/output (I/O) module 155. To provide secure data transmission and verification, in an embodiment the secure I/O module 155, at dashed (and optional, in some embodiments) circle '1', interacts with the O/S 120 to configure notifications 190. In some embodiments, this configuration 190 occurs at the launch of the secure module 115 and/or the application 110, in which the secure I/O module 155 may perform a binding to declare, to the O/S, its intent to receive (or be notified about) particular system events. For example, the secure I/O module 155 may indicate that it seeks notification of all touchscreen events (e.g., representing a user input being made by the user), or some or all events related to a particular kernel module or driver. As another example, the configuration 190 may include registering an intent to receiving notifications of USB-triggering events, which may also be generated when a user strikes a key at a USB keyboard, moves a USB mouse, is observed by a USB camera, or interacts with any other input or output device. Thus, the secure I/O module 155 may configure 190 the O/S 120 to notify it of events raised during the generation and/or processing of user input and/or output data.

At optional circles '2A' and '2B' the secure I/O module 155 receives a request 191 for user input generated by either the application 110 or an authentication and binding front end service 160. In various embodiments, this request 191 may be in the form of an API call (e.g., from the application 110), a function or routine call (e.g., from the authentication binding front end service 160), inter-process communication, or even an event being generated by the O/S 120 (responsive to the application 110 or authentication binding front end service 160). In an embodiment, the request 191 at circle '2A' may be triggered by the application 110, for example, wanting the user 145 to provide a PIN during a checkout flow. In some embodiments, this request 191 may indicate a particular type of user input to be sought from the user 145, and optionally may include indications of one or more user interfaces to be used to solicit that user input (e.g., an index identifying a user interface stored in a memory of the computing device 105 or another computing device (e.g., server computing device 135), such as a URL or URI).

In response, at circle '3', the secure I/O module 155 passes obfuscated user interface data 192 through the O/S 120 to the graphics hardware 177 to be presented to the user 145. In contrast to typical "drawing" routines performed by applications that utilize high-level libraries and drawing tools (e.g., requesting particular shapes and/or user input elements to be presented), the secure I/O module 155 instead passes low-level obfuscated user interface data 192 through the O/S 120 so that the O/S 120 (and any other potentially compromised software in the system) is unable to easily interpret or understand.

In some embodiments, this passing of obfuscated user interface data 192 includes drawing a user interface on a pixel-by-pixel basis. Thus, the secure I/O module 155 may populate a display buffer (via the O/S 120) by setting pixel values comprising a pixel color and/or intensity/brightness value for the pixel. By setting a user interface pixel-by-pixel, the O/S 120 cannot easily determine what the "real" human-understandable content within the user interface is, whereas in traditional systems it is computationally easy to do so, as it is often clearly indicated within a "draw" instruction made using a graphics library. In some embodiments, this pixel-by-pixel drawing occurs through an implementation of a graphics driver stack within the secure I/O module 155 itself, which operates to translate higher-level graphics instructions to the low-level pixel values using one or more levels of abstraction. In some embodiments, though, the secure module 115 stores a set of already-translated sets of pixel values representing different user interface possibilities, and simply uses these sets of pixel values without needing to perform any translating of higher-level graphics into this low-level data.

Although not illustrated, during this process at circle '3' the secure module 115—due to its previous configuration of notifications 190—may observe the flow of the user interface data as it travels to the graphics hardware 177 to be displayed. Thus, the secure module 115 may, in some embodiments, track as "measured value data" (or "trace data") the set of applications/modules that the user interface data travels through, and optionally one or both of the input values provided to each application/module and the output values resulting therefrom.

After the user interface is presented to the user 145, the user may provide a user input 193 at circle '4' using user input hardware 180 such as a touchscreen. In some embodiments, this causes the user input hardware 180 to generate an interrupt that is processed by the O/S 120, which may be passed on to the secure module 115 (e.g., due to the prior configuration of notifications 190 step at optional circle '1'). Thus, the O/S does not have easy access to any actual user input data, and thus it cannot be compromised. In some embodiments, upon the user 145 providing the user input 193, the O/S 120 generates an event including low-level user input information (e.g., coordinate information or a velocity/trajectory from a touchscreen or mouse, capacitance or resistive values from a touchscreen, a voltage from an input device, gyro-sensor information, etc.) that again is not easily decipherable by the O/S 120 because it does not easily understand what the low-level user input information is referencing. Accordingly, the true user input is thereby obfuscated 194 as it passes, at circle '5', from the hardware 125 through the O/S 120 back to the secure module 115.

Again, in some embodiments, during this process of circle '5' the secure module 115—due to its previous configuration of notifications 190—may observe the flow of the user input data as it travels from the user input hardware 180 up toward the secure module 115. Thus, the secure module 115 may, in some embodiments, track as "measured value data" (or "trace data") the set of software and/or hardware applications/modules that the obfuscated user input data 194 "travels" through (e.g., is processed by), and optionally one or both of the input values provided to each application/module and the output values resulting therefrom. In some embodiments, the secure I/O module 155 generates one measured value trace information based upon the tracked "measured value data" by combining this information together (e.g., concatenating it).

With the obfuscated user input data 194, the secure I/O module 155 may de-obfuscate this data to arrive at a representation of the "true" user input (i.e., de-obfuscated user input data), which may be a value of a button that was clicked (e.g., a number or other alphanumeric text), typed text, a drawn shape, etc. In some embodiments, the secure I/O module 155 maintains mappings of the displayed user interface that was presented to the user 145, and thus can determine, from the low-level information, what user interface element was selected or what type/value of input was provided. For example, when a user interface was constructed that included two buttons (that are capable of being single-clicked), the secure I/O module 155 may receive coordinate information of the user input, and determine whether the coordinate information lies within one of the two buttons. Of course, this simple example is merely illustrative, and much more complex scenarios are enabled by embodiments of the invention. For example, in some embodiments where a user has performed a "trace" or "drag" user input 193, the secure I/O module 155 may compute the true user intent of the input through vector/velocity calculations received as the obfuscated data.

In a scenario where the authentication and binding front end service 160 triggered this process (see circle '2B'), the secure I/O module 155 may provide 195 at circle '6C' the de-obfuscated user input data—and optionally the measured value "trace" data—to the authentication and binding front end service 160, which might then perform an authentication of the user 145 based upon stored user information (e.g., a stored PIN or password, for example, and/or by performing an analysis of the trace data to ensure that nothing "suspicious" or otherwise atypical happened in the processing of the user input—such as being passed to an unfamiliar module or having a module generate an atypical output value given a particular input value), and provide the result of the authentication to another application 110 or server computing device 135. Similarly, in a scenario where the application 110 initially triggered the process (see circle '2A'), the secure I/O module 155 may provide 195 at circle '6B' the de-obfuscated user input data—and optionally the measured value "trace" data—to the application 110, which itself may perform any tasks it deems necessary, such as performing user authentication and/or analyzing the result of the "measured value" trace data.

However, in some embodiments and configurations, the secure I/O module 155 may pass at circle '6A-1' the de-obfuscated user input data and optionally the measured value trace information to a data protection module 150. The data protection module 150, either previously or in response to circle '6A-1', may be involved in generating a secure tunnel through one or more networks 130 (e.g., the Internet, one or more local area networks (LANs), etc.) to an authentication module 140 of a (remote) server computing device 135. This secure tunnel generation may be initiated by either the server computing device 135 or the secure module 115 (in particular, the data protection module 150). In some embodiments, the data protection module 150 implements its own network stack on top of (i.e., in addition to) a network stack already implemented and operating by the underlying O/S 120 and/or network interfaces 175. For example, the O/S 120 may generate a TCP/IP connection (or even an encrypted—SSL or TLS—connection) with the server computing device. On top of that underlying connection, the data protection module 150 and the server computing device 135 may generate another SSL or TLS connection through another handshake procedure to generate one or more encryption keys. Thus, the data protection module 150 may encrypt a message 127 including the de-obfuscated user input and/or measured value trace information using a negotiated key, pass this encrypted message down to the O/S, which will send it within a payload (e.g., in an application layer—layer 7 of the OSI model) of its own underlying connection, which may require that this encrypted message again be encrypted by the O/S 120 when the underlying connection itself is a secure connection. Accordingly, the true content of the message being sent, at circle '6A-2' from the data protection module 150 never exists in an unencrypted form as it is being passed through the underlying O/S 120 (or across the network(s) 130), and thus keeps it away from being easily compromised. Moreover, any tampering of this message—such as by a compromised O/S 120—can be easily observed by either side of the connection (i.e., the secure module 115 or server computing device 135). At circle '6A-3', the authentication module 140 access the decrypted, de-obfuscated user input data (and perhaps the measured value trace information, when it exists) to perform an authentication of the user 145 and of the integrity of the user input data.

Figure 2:
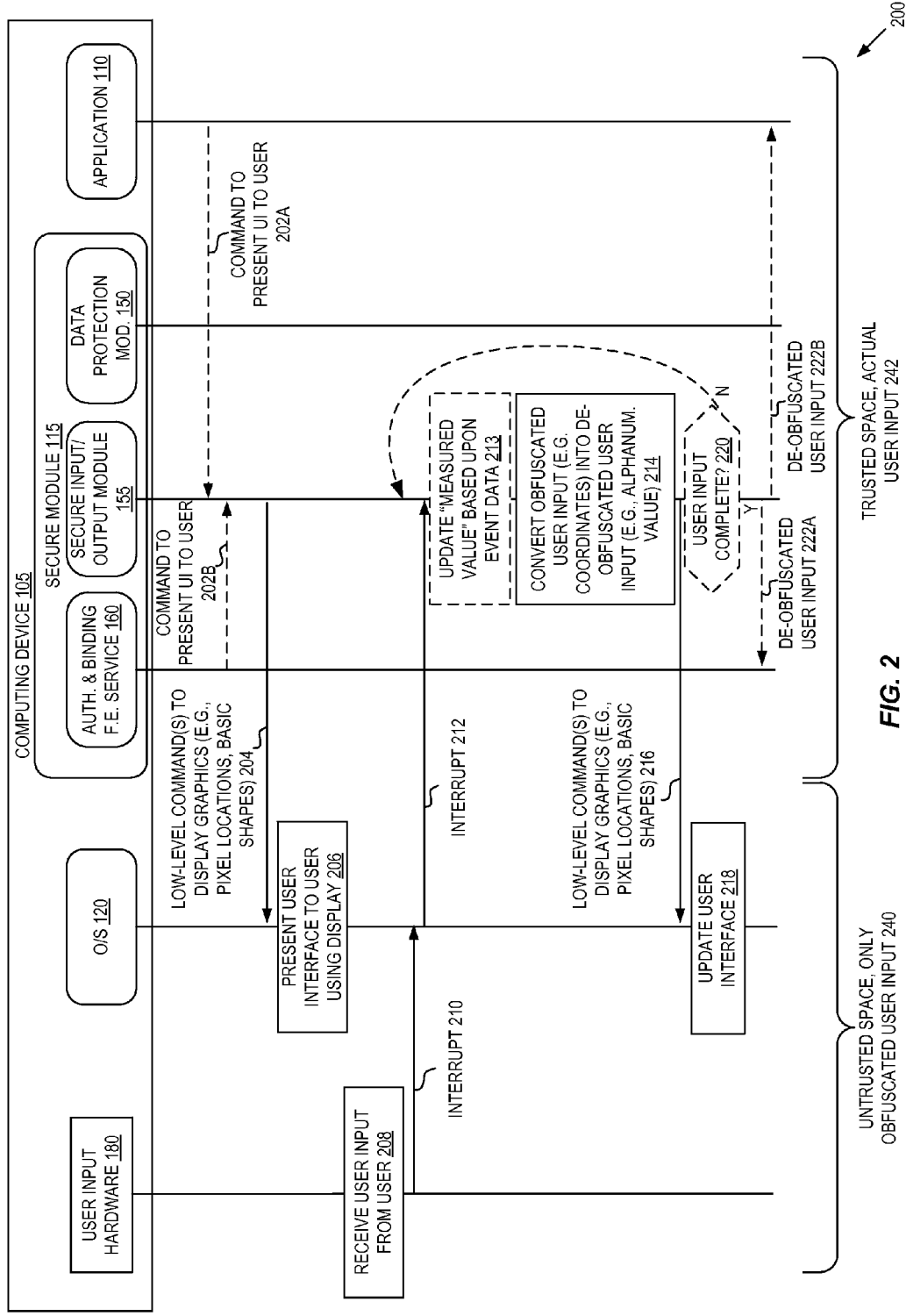
FIG. 2 illustrates a sequence diagram depicting a secure data transmission within an untrusted computing device according to an embodiment of the invention.

FIG. 2 illustrates a sequence diagram 200 depicting a secure data transmission within an untrusted computing device 105 according to an embodiment of the invention. This sequence diagram 200 illustrates interactions between and by user input hardware 180, the O/S 120, the secure module 115 (including the authentication and binding front end service 160, the secure I/O module 155, and the data protection module 150), and an application 110 of a computing device 105. The sequence 200 begins at 202A and 202B, which mirror circles '2A' and '2B' of FIG. 1, in which a command to present a user interface to a user (as opposed to a command to request a user input from a user 191 of FIG. 1) is received by the secure I/O module 155 from either the authentication and binding front end service 160 or the application 110. Of course, these arrows are dotted and thus optional, indicating that there are other ways for the secure I/O module 155 to begin the flow. Upon determining a need to present a user interface to a user, the secure I/O module 155 sends low-level commands to display graphics 204 to the O/S 120, which may include pixel values (e.g., locations, colors, and/or brightness values) and/or basic low-level shapes (e.g. lines), but do not include high-level commands that facially reveal the content of the user interface to the O/S 120. As another example, such commands or instructions may be to turn on or off certain display pixels on the display; however, instructions to draw a particular number or letter, for example, will not be transmitted to prevent any malware that might be present in the O/S from accessing that data.

Next, the O/S 120 presents 206 the user interface to the user using a display using any one of a variety of techniques known to those of skill in the art.

At some point, in an embodiment, the user provides 208 a user input (e.g., a click, touch, swipe or other gesture, etc.), which is received at user input hardware 180. In this depicted embodiment, this triggers the generation of an interrupt 210, which is processed by the O/S 120, and the interrupt 212 is then forwarded to the attention of the secure I/O module 155 (e.g., due to an earlier, non-illustrated configuration performed between the secure module 115 and the O/S 120). Optionally, the secure I/O module 155 updates a "measured value" information trace value based upon the interrupt 212 and/or earlier or later events reported to the secure I/O module 155. At block 214, the secure I/O module 155 then converts the received obfuscated user input (e.g., an x-y/Cartesian coordinate of a user interface) into de-obfuscated user input (e.g., an alphanumeric value).

To provide the user with feedback indicating that their input was received, in an embodiment the secure I/O module 155 may again issue low-level commands to display graphics 216 to the O/S in order to update the user interface accordingly. For example, a user interface element may be updated to include the value that the user inputted or a representation thereof (e.g., an asterisk or circle). In response, the O/S 120 will update the user interface 218.

Additionally, in some embodiments where the user input value is a result of multiple individual user inputs, a decision block 220 may determine whether the user input is complete, and if not, proceed back to await another interrupt 212. If the user input is complete, or if no such decision block 220 is used in that particular embodiment, the secure I/O module 155 may provide the de-obfuscated user input data (and/or measured value trace information) to one or both of the authentication and binding front end service 160 or the application 110.

Accordingly, this depicted embodiment clearly indicates that a portion of the computing device 105 is within an untrusted space 240, in which only obfuscated user input (and/or obfuscated user interface data) passes, and another portion of the computing device 105 is within a trusted space 242 where the actual user input is allowed to exist.

Figure 3:
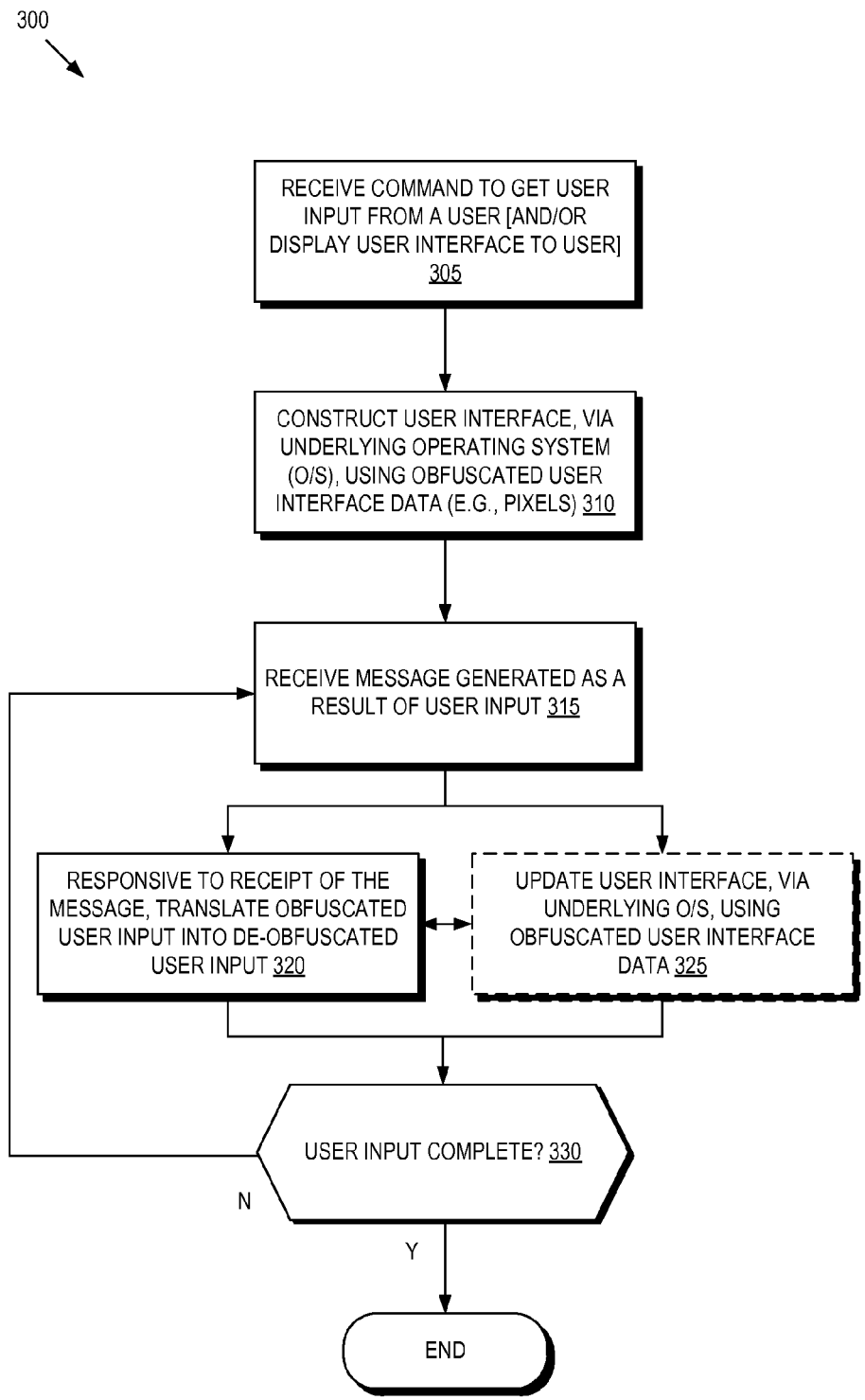
FIG. 3 illustrates a method for performing a secure data transmission within an untrusted computing device according to an embodiment of the invention.

FIG. 3 illustrates a method 300 for performing a secure data transmission within an untrusted computing device 105 according to an embodiment of the invention. In an embodiment, method 300 is performed by the secure I/O module 155 of the untrusted computing device 105. The method 300 includes, at block 305, receiving a command to get user input from a user. This command may include a description/ definition of a user interface to be used (e.g., high-level descriptions such as HTML or Javascript) or an identifier/index of a user interface (e.g., an index value mapping to a stored user interface, a URL, etc.) to be used to get the user input. In some embodiments, this command comes from another module within the secure module 115, but in some embodiments the command comes from an application 110 and thus is from outside the secure module 115.

At block 310, the method 300 includes constructing a user interface, via an underlying operating system of the computing device, using obfuscated user interface data. In an embodiment, this construction includes populating a display buffer with pixel data on a pixel-by-pixel basis, which precludes the operating system (or any corrupt portions thereof) from gaining an understanding of what elements will exist within the user interface.

At block 315, the method 300 includes receiving a message generated as a result of user input. This message may comprise an interrupt generated responsive to the user providing the user input, or may comprise an event message indicating an event generated responsive to the user providing the user input. In an embodiment, the message is sent by the O/S of the computing device. In some embodiments, the message includes obfuscated user input, but in other embodiments the message merely instructs the secure module 115 that user input has been provided, and that it needs to proactively determine the user input (e.g., by interacting with the O/S, reading memory values, etc.).

This method 300 may continue with one or both of block 320 and block 325. Block 320 includes, responsive to the receipt of the message, translating obfuscated user input into de-obfuscated user input. In some embodiments, this translation includes accessing a user interface map indicating which user interface elements exist at what locations of the presented user interface. In some embodiments, this translation includes determining, based upon received sensor data, a gesture that was made by the user. In some embodiments, this translation may include performing an optical character recognition (OCR) process using an updated user interface display visually illustrating a user input. In some embodiments, the de-obfuscated user input comprises an alphanumeric value.

Block 325, which is optionally performed, includes updating the user interface, via the underlying O/S, using obfuscated user interface data. In an embodiment, this updating provides an updated user interface to the user to indicate that the system has registered (or processed) the provided user input. In an embodiment, this updating comprises sending low-level obfuscated user interface data to the underlying O/S.

Next, at block 330, a decision block questioning whether the user input is complete is executed. In some embodiments, the requested user input is a particular number of input values (e.g., 4 alphanumeric characters, 1-25 alphanumeric characters terminated by an "enter" input, etc.). In these embodiments, if less than all of the requested input values have been provided, the decision block 330 redirects the method 300 back to block 315 to await further user input. When user input is complete, the process ends.

Figure 4:
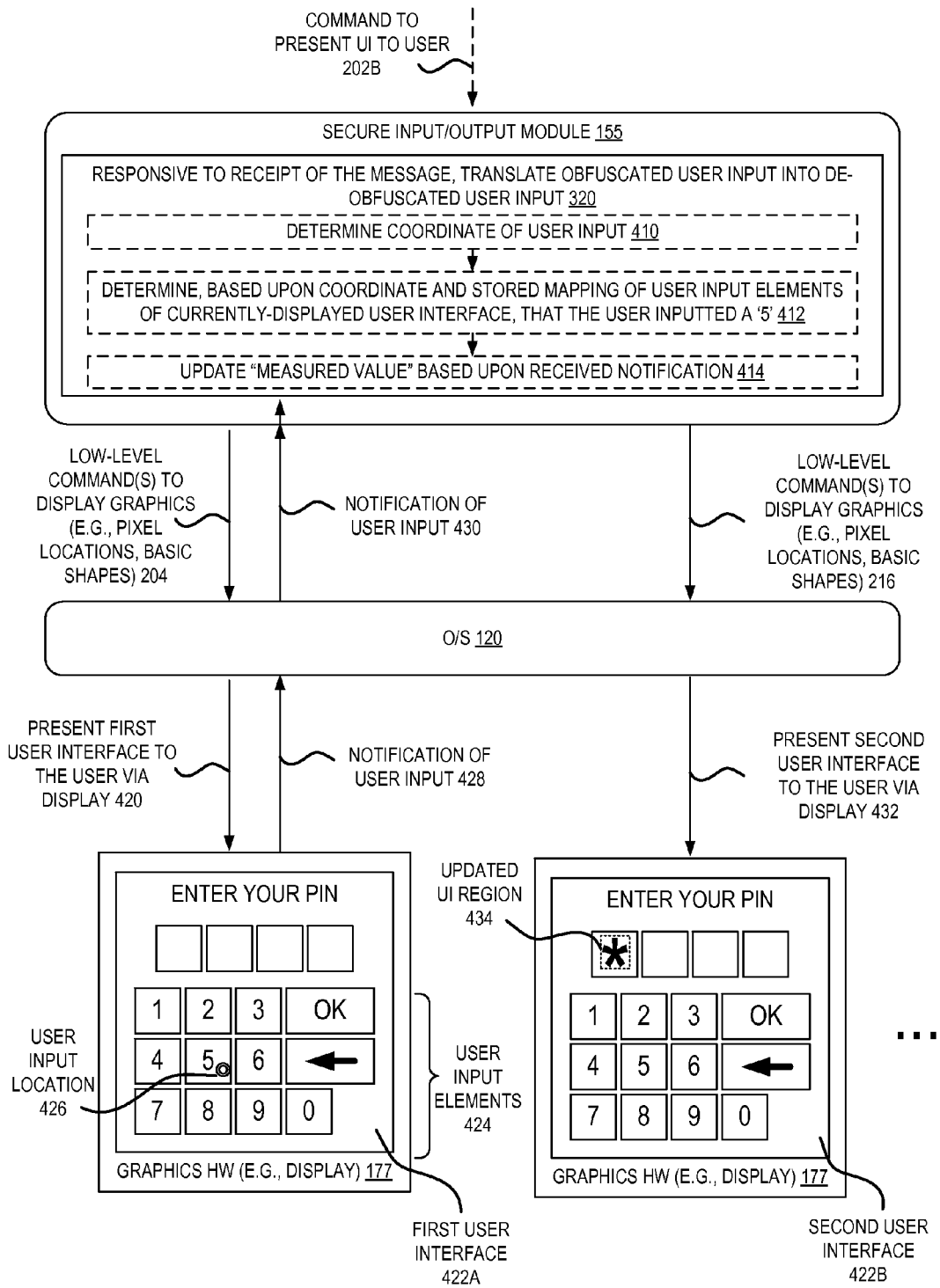
FIG. 4 illustrates a block diagram depicting user interface generation and modification in a secure data transmission within an untrusted computing device according to an embodiment of the invention.

FIG. 4 illustrates a block diagram 400 depicting user interface generation and modification in a secure data transmission within an untrusted computing device according to an embodiment of the invention. At the top of this block diagram 400, a command 202B to present a user interface to a user is optionally received by the secure I/O module 155 (just as in FIG. 2), although other commands, messages, or events can trigger the following operations in other embodiments. After identifying the user interface to be presented, the secure I/O module 155 again sends low-level commands 204 to the underlying O/S 120, which causes a first user interface to be presented 420 to the user via a display.

On exemplary first user interface 422A presented on graphics hardware (e.g., a display) 177 is presented herein for ease of understanding that includes a plurality of user input elements 424 (here, buttons) under a text box indicating "ENTER YOUR PIN." Of course, in other embodiments many different types of user interfaces may be generated that may include many other types or numbers of user input elements. However, this first user interface 422A or others will similarly be constructed using low-level commands 204 that serve as obfuscated user interface data that is not "understood" by the O/S 120.

At some point, the user provides user input at a location 426 of the display. In this embodiment, that location 426 is within a user input element 424 representing a number '5'. A notification of user input 428 is generated by the graphics hardware 177 and/or user input hardware 180 (not illustrated) and provided to the O/S 120, which itself sends a notification 430 of the user input back to the secure I/O module 155.

At this point, in some embodiments, the secure I/O module 155 performs a set of operations 320 responsive to receipt of the "notification of user input" 430 message that translates the obfuscated user input into de-obfuscated user input. In the depicted embodiment, this includes, by the secure I/O module 155, determining 410 a coordinate of the user input. In various embodiments, the coordinate may be provided in the notification 430/428, or acquired by the secure I/O module 155 in response to receipt of the message. Then, in this embodiment, the secure I/O module 155 will determine 412, based upon the coordinate and a stored mapping of user input elements of the currently-displayed user interface, that the user attempted to input the number '5'. For example, the secure I/O module 155 may determine that the coordinate (e.g., [x=237,y=388]) is a point existing with a boundary of a user input element 424 defined for the value '5' (e.g., where number '5' is represented in the mapping as [225<=x<=250] and [375<=y<=400]). Since both of the values of the coordinate lie within those respective defined ranges, the secure I/O module 155 knows that the de-obfuscated input value is '5'.

Next, at block 414, the secure I/O module 155 may also update the "measured value" trace information based upon the received notification. In an embodiment, the notification (or an earlier or later notification) indicates that the user input value was processed by one or more software and/or hardware modules, and may indicate input and/or output values passed to/from those modules. This information may be stored as part of the "measured value."

In an embodiment, responsive to receipt of the notification of the user input 430 message, the secure I/O module 155 may also update the first user interface 422A to provide feedback to the user that the input was acknowledged. Thus, in an embodiment, the secure I/O module 155 sends additional low-level commands to display updated graphics 216 to the O/S 120, which causes a second user interface to be presented 432 to the user via the display. In this depicted embodiment, the second user interface 422B is nearly the same as the first user interface 422A aside from one updated user interface region 434 being modified to indicate that a first digit of a PIN was received (via placing an asterisk in a box).

Figure 5:
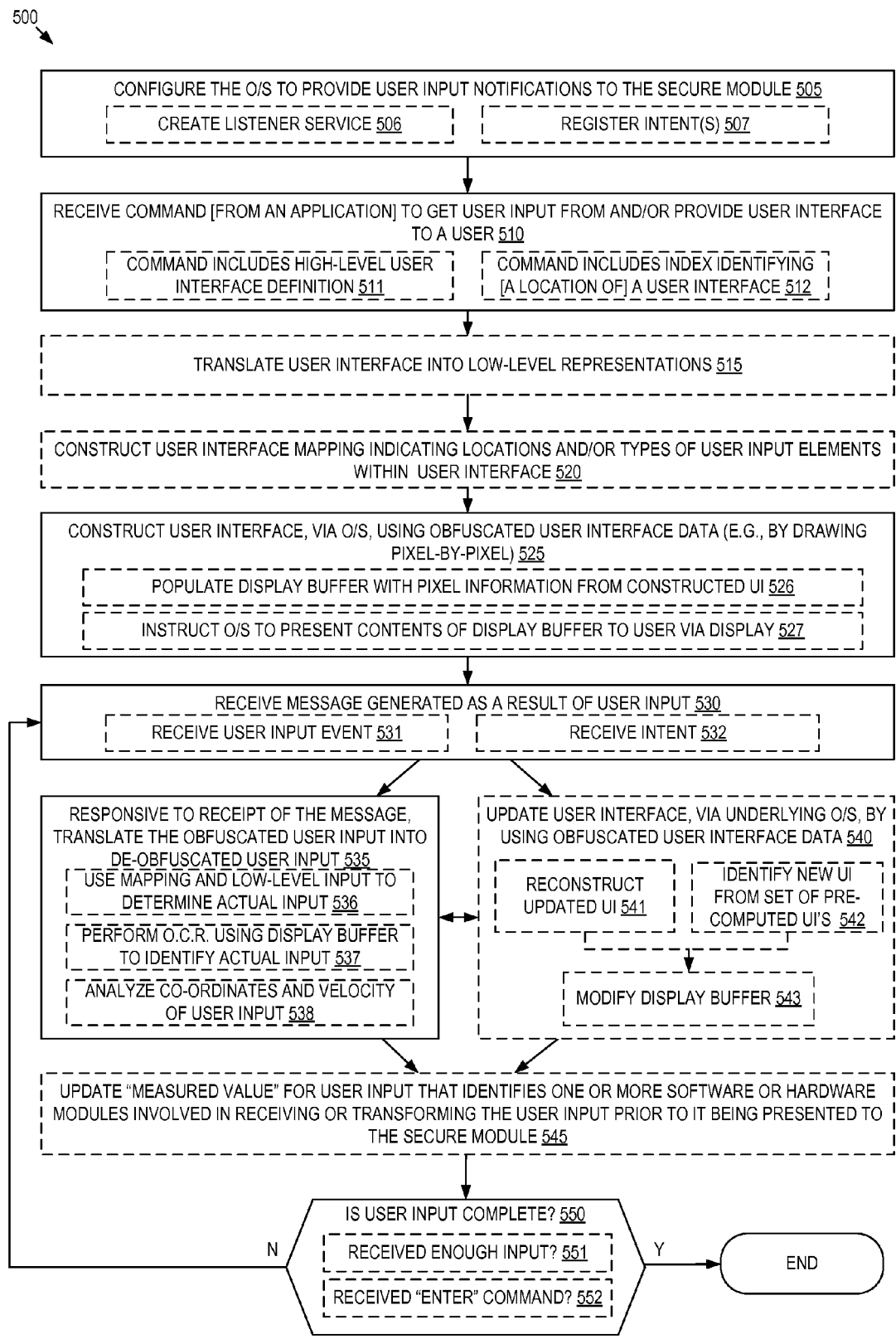
FIG. 5 illustrates a method for performing a secure data transmission within an untrusted computing device according to an embodiment of the invention.

FIG. 5 illustrates another method 500 for performing a secure data transmission within an untrusted computing device according to an embodiment of the invention. In an embodiment, this method 500 is performed by the secure I/O module 155 executing on top of an underlying operating system, though in other embodiments the method may be performed by different or additional modules.

At block 505, the method 500 includes configuring the O/S to provide user input notifications to the secure module. This block 505 may occur once as the secure module is initially installed or configured, or may occur each time the secure module begins execution. In some embodiments, block 505 includes creating a listener service 506 deemed a "notification listener service" or just a "listener." This listener service may execute independent to the secure module, and upon the occurrence of a particular type of system occurrence (or "event"), the service will detect the event and report back the information to the secure module. Accordingly, the listener service may be configured to detect certain hardware events (e.g., a user touching a touchscreen) or certain software events (e.g., a driver or block of code receiving a value and/or outputting a value). In some embodiments, block 505 includes registering 507 one or more intents. Intents are also known to those of skill in the art. In some embodiments, intents are asynchronous messages that allow application components (e.g., the secure module) to request functionality from other components. Thus, the secure module may interact with components from the same applications as well as with components contributed by other applications. For example, the secure module can be launched when an external event—such as a user touching touchscreen or taking a picture—occurs.

The depicted method 500 also includes, at block 510, receiving a command to get user input from (or provide a user interface to) a user. This command may come to the secure I/O module 155 from another component of the secure module itself, or may come from a completely different application in the form of an API or function call. In some embodiments, the command includes a high-level definition of a requested user interface 511, which may identify colors of the user interface, text used in the user interface, graphical elements of the user interface, user input elements to be placed in the user interface, etc. For example, the high-level definition does not specify the user interface on a pixel-by-pixel basis but uses higher level abstractions (e.g., within XML) identifying elements within the user interface that are to be created. In some embodiments, the command includes an index identifying a user interface 512. For example, in an embodiment the index identifies a location of a user interface, which may be a location that is local to the secure I/O module 155 (e.g., an index into a set of stored user interfaces) or remote to the secure I/O module 155 (e.g., a URL, URI, hostname, directory, etc., of a resource available across a network). Thus, in some embodiments, using the index, the secure I/O module 155 may request and receive the user interface information.

Optionally, at block 515 the secure I/O module 155 may translate the user interface into low-level representations, or "obfuscated" user interface data. Although in some embodiments the user interfaces are already stored as low-level representations, in other embodiments, the user interfaces may be high-level representations and thus, using a graphics stack, these high-level representations are translated into low-level representations (e.g., pixel values). For example, if a high-level representation indicates that a background of the user interface is to be the color black, then background pixel locations may be identified and then set to be black.

Optionally, at block 520, the method includes constructing a user interface mapping that indicates locations and/or types of user input elements within the user interface. Thus, in some embodiments, elements (e.g., particular objects within the user interface) in the user interface are "mapped" such that their location is recorded. For example, a user input element of a button or text-box may be recorded in the user interface mapping with a unique identifier of the user input element along with location information of that element, such as a range of coordinates (e.g., from x:[200-250] and y:[305-310]).

At block 525, the method includes constructing the user interface, via the operating system, using the obfuscated user interface data. In some embodiments, this includes populating 526 a display buffer with pixel information from the (constructed) user interface, and instructing 527 the O/S to present the contents of the display buffer to the user via the display.

At block 530, the method includes receiving a message generated as a result of user input being provided to the computing device. In some embodiments—such as when the secure I/O module has previously created a listener service at block 506—block 530 may include receiving 531 a user input event from the listener service. In some embodiments—such as when the secure I/O module has previously registered one or more intents at block 507—block 530 may include receiving 532 an intent generated by the operating system. In some embodiments, this message includes obfuscated user input data 194, but in other embodiments, based upon either the type of the message or data within the message, the secure I/O module then proactively acquires the obfuscated user input data (e.g., from a device or system memory, from the O/S, etc.)—such as when an interrupt is provided to the secure I/O module.

The method 500 may also include one or both of blocks 535 and 540, which may occur at least partially in parallel, be sequential, be triggered by one another, or even occur at completely different times. Block 535 includes, responsive to the receipt of the message, translating the obfuscated user input into de-obfuscated user input. In some embodiments, this includes using, at block 536, the previously-generated user interface mapping to identify which element(s) of the user interface have been interacted with, together with the low-level "obfuscated" user input, to determine the actual input. For example, the low-level input of a coordinate of a click/touch can be used together with a mapping of coordinates of what elements exist within a user interface to determine which, if any, user interface input element was interacted with.

In some embodiments block 535 includes, at block 537, performing an optical character recognition process using an updated display buffer to identify the actual user input. In some embodiments, block 535 includes, at block 538, analyzing and translating the low-level input to determine the user input (e.g., a gesture)—perhaps by analyzing coordinates, generating/analyzing a velocity of the user input, aggregating sensor values to determine a gesture, and/or creating a set of vectors based upon the user input.

Optionally, block 540 includes updating the user interface, via the underlying O/S, through the use of additional obfuscated user interface data. This may occur responsive to receipt of the message 530 to provide feedback (e.g., a graphical change) to indicate that the user's input has actually been received. This update may place a human-comprehensible version of the de-obfuscated user input on the display, update a graphic on the display, or somehow change the display compared to the pre-input state. In some embodiments, block 540 includes, at block 541, reconstructing an updated UI by again generating new low-level representations and at block 543 modifying the display buffer accordingly. In some embodiments, block 540 includes, at block 542, identifying a new user interface from a set of "pre-computed" user interfaces and at block 543 modifying the display buffer according to that identified new user interface. With a modified display buffer, the computing device may then present the new user interface to the user via a display.

Optionally, the method 500 includes block 545, in which the secure module updates a "measured value." This may include, in an embodiment, updating a stored measured value data value, which identifies one or more software or hardware modules involved in receiving or transforming the user input prior to it being presented to the secure module. In an embodiment, the measured value data value is updated with new data based upon the user input leading to block 530, and may include identifiers of one or more modules (e.g., drivers, functions, hardware elements, etc.) processing the user input, and may include an input value and/or an output value of that respective module. In some embodiments, the measured value data for each portion of user input is consolidated together (e.g., concatenated) and ultimate provided to an authentication module, which can examine the measured value data to look for the existence of atypical modules being involved in the processing of the user input, atypical inputs being provided to modules, atypical outputs being generated by modules, or atypical combinations of modules being involved.

At decision block 550, the method includes determining whether the user input is complete, which may include determining whether "enough" input has been received (at block 551). For example, a user interface may include a number of input elements that need to be modified by a user to continue, or a user interface may include a user input element that needs to have a number (or a range of numbers) of distinct inputs provided (e.g., an input box that requires 4 (or more) alphanumeric characters be input). In some embodiments, block 550 includes determining, at block 552, whether an "enter" command or some other user input completion indicator has been triggered by the user. For example, some user interfaces may include an "enter" or "done" button that, when selected by the user, will cause the method to complete.

If the user input is deemed to not yet be complete at block 550, the flow of the method may continue back to before block 530, where another message generated as a result of another user input occurs. If the user input is instead deemed to be complete, the method ends.

In some embodiments, when the user input is complete, the de-obfuscated user input and/or the measured value data is provided to an authentication module (or another module or application) to allow for the authentication of the user and/or the computing device itself. Thus, in some embodiments, this information needs to be provided to an external entity, which requires utilizing the potentially-compromised operating system and networking interfaces to transmit this sensitive data. However, embodiments of the invention anticipate and overcome the problem of relying upon these insecure elements by utilizing a novel secure tunneling technique.

III. Secure Tunnels Using A Nested Communication Stack

In existing implementations not utilizing the invention, secure communication channels between a security application on a device and an endpoint, such as a secure remote server, terminate at the Operating System on the device. Most secure communication protocols (e.g., SSL) and Network Stacks are implemented by the Operating System. An application requesting a secure communication channel with another entity (local or remote) calls an Application Programing Interface (API) provided by the Operating System residing on the same device. The Operating System sets up the secure communication channel between the end point and itself. In other words, the secure communication channel terminates at the Operating System and not at the security application requesting the secure communication channel. Sensitive data transported over the secure communication channel between the end point and the security application is exposed since it is not protected between the Operating System on the same device and the security application. Malicious software running on the same device may gain access to security sensitive data as the data moves between the termination of the secure communication channel in the Operating System and the security application. Furthermore, the security sensitive applications may rely on the proper implementation of the security protocol for setting up the secure communication channel in the Operating System. Malicious code affecting the Network stack or the security protocols in the Operating System can compromise the data. Similar problems may exist for a secure module (e.g. secure container such as a virtualized sandbox) that may rely on the Network Stack and Security Protocols implemented in an underlying Operating System.

Embodiments of the invention describe a secure nested network communications stack (e.g., SSL/TLS) implemented in the secure module, such as in a virtualized sandbox environment, that is tamper resistant and protected. Embodiments of the invention provide a secure networking solution for a software-only or a hardware-assisted software environment. In one implementation, embodiments of the invention propose a software only based secure channel that relies on a tamper resistant and protected certificate/key store. In one aspect of the implementation, the certificate/key store may be best-effort and time-bound.

Using the network communication stack and the security protocols implemented inside the secure module, embodiments of the invention create a secure communication channel between the secure container executing on the device and a remote entity, such as a remote server (e.g., as part of a cloud service). The secure communication channel terminates inside the secure module on the device. The credentials and key exchange are protected and provisioned in software inside the secure module. In one implementation, the credentials and the key exchange may be time bound and be frequently revoked to maintain high level of security. Thus, after the expiration of a period of time, one side (e.g., the authentication module 140) may cause new encryption keys to be generated, either through a command or by simply dropping the existing the connection and initiating a new handshake.

Figure 6:
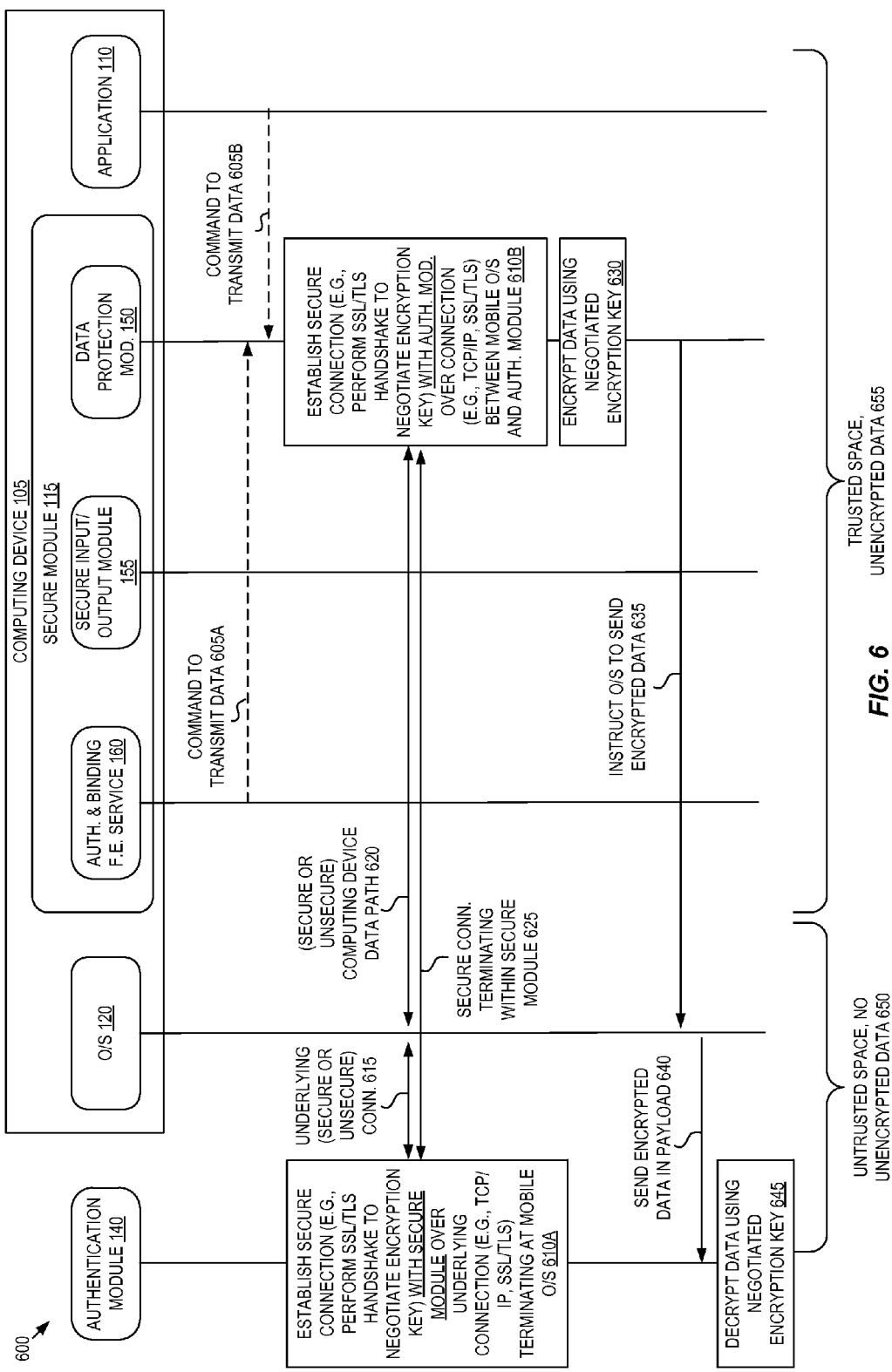
FIG. 6 illustrates a sequence diagram depicting a secure data transmission between a secure module executing on an untrusted computing device and an external authentication module according to an embodiment of the invention.

FIG. 6 illustrates a sequence diagram 600 depicting a secure data transmission between a secure module executing on an untrusted computing device and an external authentication module according to an embodiment of the invention. In an embodiment, this sequence occurs at the end of the method 500 presented in FIG. 5.

FIG. 6 depicts the computing device 105 including the secure module 115 and the potentially compromised underlying O/S 120, which needs to secure transmit data to an external authentication module 140. At 605A-605B, a command to transmit data (e.g., de-obfuscated user input data and/or measured value data) is received by the data protection module 150 from either an authentication and binding front end service 160 or an application 110. Next, the data protection module 150—which includes its own independent networking stack (e.g., implementing TLS and/or SSL, for example) on top of any networking stack provided by the underlying O/S 120—works to establish a secure connection with the authentication module 140 in blocks 610A-610B. In some embodiments, the data protection module 150 begins a secure handshake with the authentication module following a protocol (e.g., SSL 1.0-3.0, TLS 1.0-1.2, etc.). In some embodiments, although the handshake is typically communicated "in the clear" (i.e., as unencrypted application layer data, for example), this handshake may be used utilizing pre-provisioned or previously-negotiated encryption keys, thus allowing the data protection module 150 to avoid "leaking" any information to the underlying O/S 120.

Thus, in an embodiment, the data protection module 150 provides handshake data (either encrypted or unencrypted) to the O/S 120 for transmission via a secure or unsecure data path 620, and the O/S then configures its own (or uses its own existing) underlying connection 615, which may be secure (encrypted, such as another TLS or SSL connection) or unsecure (plaintext, such as a plain TCP/IP connection).

Upon a completion of the handshake, the data protection module 150 and the authentication module 140 have negotiated encryption keys (e.g., asymmetric keys) to be used for the secure connection 625 terminating within the secure module, and will switch to using those keys to encrypt future communications using the secure connection 625. At this point, the data protection module 150 may encrypt 630 the to-be-transmitted data using the negotiated encryption key, and instruct 635 the O/S to send the encrypted data using its underlying connection 615. Thus, the O/S sends 640 the encrypted data in a payload to the authentication module 140, which may then decrypt 645 the data using its negotiated encryption key. Accordingly, throughout the process, no security sensitive data is passed "in the clear" (i.e., in a non-obfuscated or non-encrypted manner) within the untrusted space 650 comprising the O/S 120 and the network between the computing device 105 and the authentication module 140; although within the trusted space 655 the security sensitive data may be used for constructive purposes as normal.

In some embodiments, the remote server computing device 135 executing the authentication module 140 maintains control over the secure tunnel. For example, in an embodiment the remote server computing device 135 may use heartbeats (e.g., periodic, expected messages transmitted according to a defined schedule that indicate that the transmitting entity is "alive" and operating properly) and/or timers to track the availability and state of the other side of the connection. Thus, in some embodiments, a timeout of these heartbeats (e.g., not receiving a certain number of heartbeat messages over a period of time—which may be tracked by the timers) will result in the remote server computing device 135 terminating the secure tunnel. Similarly, in some embodiments the server computing device 135 may be configured to periodically terminate the secure tunnel after the timers count a certain period of time, which may require that another secure tunnel be re-generated. This provides a benefit in that if any other entity somehow is able to compromise the secure tunnel (e.g., view the unencrypted data passed over the encrypted tunnel), that secure tunnel will be short-lived and a new tunnel will be used, frustrating and/or eliminating the ability of the other entity to continue observing the traffic. Although the server computing device 135 here is described as maintaining control over the secure tunnel, in some embodiments the secure module 115 may be the entity terminating the secure tunnel based upon heartbeats and/or timers, and in some embodiments both the secure module 115 and the server computing device 135 may terminate the secure tunnel based upon heartbeats and/or timers.

FIG. 7 illustrates a method 700 for generating and transmitting measured value verification data using a secure tunnel between a secure module executing on an untrusted computing device and an external authentication module according to an embodiment of the invention. In an embodiment, method 700 is performed by the secure module 115.

At block 545, the method includes block 545 (as described in FIG. 5), in which the secure module generates/updates a "measured value." This may include, in an embodiment, updating a stored measured value data value, which identifies one or more software or hardware modules involved in receiving or transforming the user input prior to it being presented to the secure module. In an embodiment, the measured value data value is updated with new data based upon user input. In some embodiments, the measured value information, for at least one of the software or hardware modules (e.g., drivers, functions, hardware elements, etc.), identifies 720 an input value provided to and/or an output value generated by that respective module.

In some embodiments, the measured value data for each portion of user input is consolidated together (e.g., concatenated) and ultimate provided to an authentication module, which can examine the measured value data to look for the existence of atypical modules being involved in the processing of the user input, atypical inputs being provided to modules, atypical outputs being generated by modules, or atypical combinations of modules being involved.

At block 705, the method 700 includes sending a message including the de-obfuscated user input and the measured value information to an authentication module for analysis. In some embodiments, this includes block 710 and the use of a software-only encryption stack terminating within the secure module to generate a secure tunnel with a server computing device executing the authentication module. In some embodiments this includes, at block 715, sending the message to the verification module via the generated secure tunnel. Block 715 may include encrypting the message using an encryption key negotiated between the security module and the server computing device, and, at block 725, instruct the underlying O/S to send the encrypted message. Optionally, the encrypted message is sent within an application layer of an internet protocol (IP) message sent across a network. Optionally, the encrypted message within the application layer is further encrypted by the underlying O/S using another encryption key negotiated between the underlying O/S and the server computing device.

Finally, in some embodiments, the method 700 further includes receiving 730, from the server computing device, a response message indicating a result of the authentication module attempting to verify the user input based upon the measured value information. For example, if the de-obfuscated user input is the same as expected (e.g., matches a password or PIN value for that user stored or accessed by the authentication module), and further if the measured value information is not found to be atypical or suspicious, the response message may indicate that the user input has been verified. However, if the de-obfuscated user input is not the same as expected (e.g., does not match a password or PIN value for that user stored or accessed by the authentication module), and/or if the measured value information is found to be atypical or suspicious, the response message may indicate that the user input has not been verified.

Figure 8:
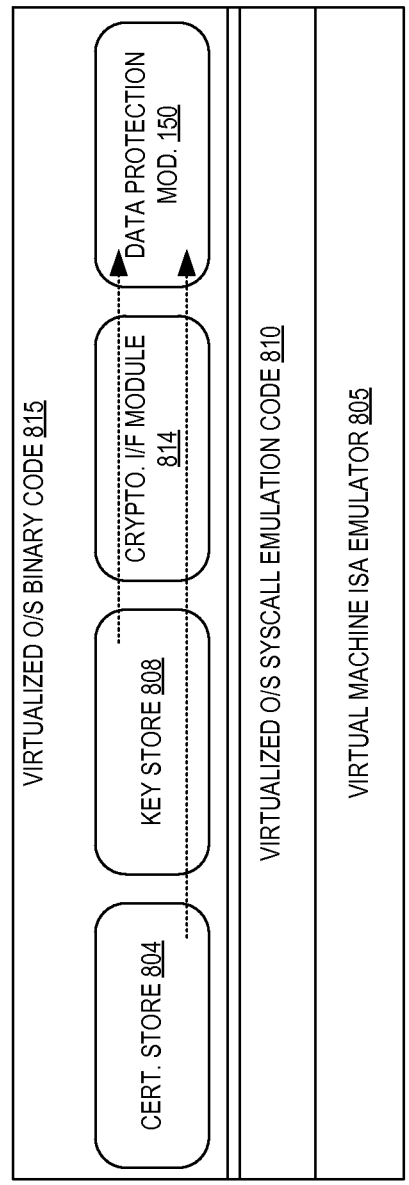
FIG. 8 illustrates a block diagram of software modules of a secure module used for generating a secure tunnel according to an embodiment of the invention.

FIG. 8 illustrates a block diagram of software modules 800 of a secure module used for generating a secure tunnel according to an embodiment of the invention. FIG. 8 illustrates one implementation of embodiments of the invention, where a secure nested network communications stack implemented in the secure module that is tamper resistant and protected. In one implementation, embodiments of the invention propose a software-only based secure channel that relies on a tamper resistant and protected certificate/key store. Using the network communication stack and the security protocols implemented inside the secure container, embodiments of the invention create a secure communication channel between the secure module executing on the device and a remote entity, such as a remote server (e.g., authentication module).

In some embodiments, the secure module executes virtualized O/S binary code 815 including a certificate store 804 to store security certificates, a key store 808 to store private keys and or negotiated encryption keys, a cryptography interface module 814 to perform cryptographic functions, and a data protection module 150. Thus, in an embodiment, the secure module (e.g., a virtual sandbox) hosts software based on the certificate 804 and key store 808. By implementing the network communication stack inside the secure container, embodiments of the invention terminate the secure communication channel within the secure container ensuring that secure traffic always terminates within the secure container. In this depiction, the virtualized O/S binary code 815 executes on top of virtualized O/S system call ("syscall") emulation code 810, which itself executes on top of a virtual machine instruction set architecture (ISA) emulator 805.

Thus, in some implementations, the network stack may be implemented by functionally splitting the security and networking responsibilities between the secure module and the host environment provided by the device. The network stack in the secure module may utilize optimized and hardened cryptographic libraries implemented in the secure module environment. In one implementation, the network stack may leverage software-based high entropy random number generators (RNG), virtual physical unclonable functions (PUF), and accurate and reliable software timers and counters. Accordingly, the secure module may eliminate its dependency upon using the computing device's underlying hardware to ensure the security of any generated secure tunnels.

As shown in FIG. 8, in one implementation, key management may be provided by the key Store 808 and the certificate management may be provided by the certificate store 804, within the secure module and thus does not rely on the Operating System or the underlying hardware of the computing device.

As described above, techniques described herein are advantageous in securely communicating between the secure container or any other security application and a remote secure server without exposing data to other applications or malware on the mobile device.

IV. Exemplary System

Figure 9:
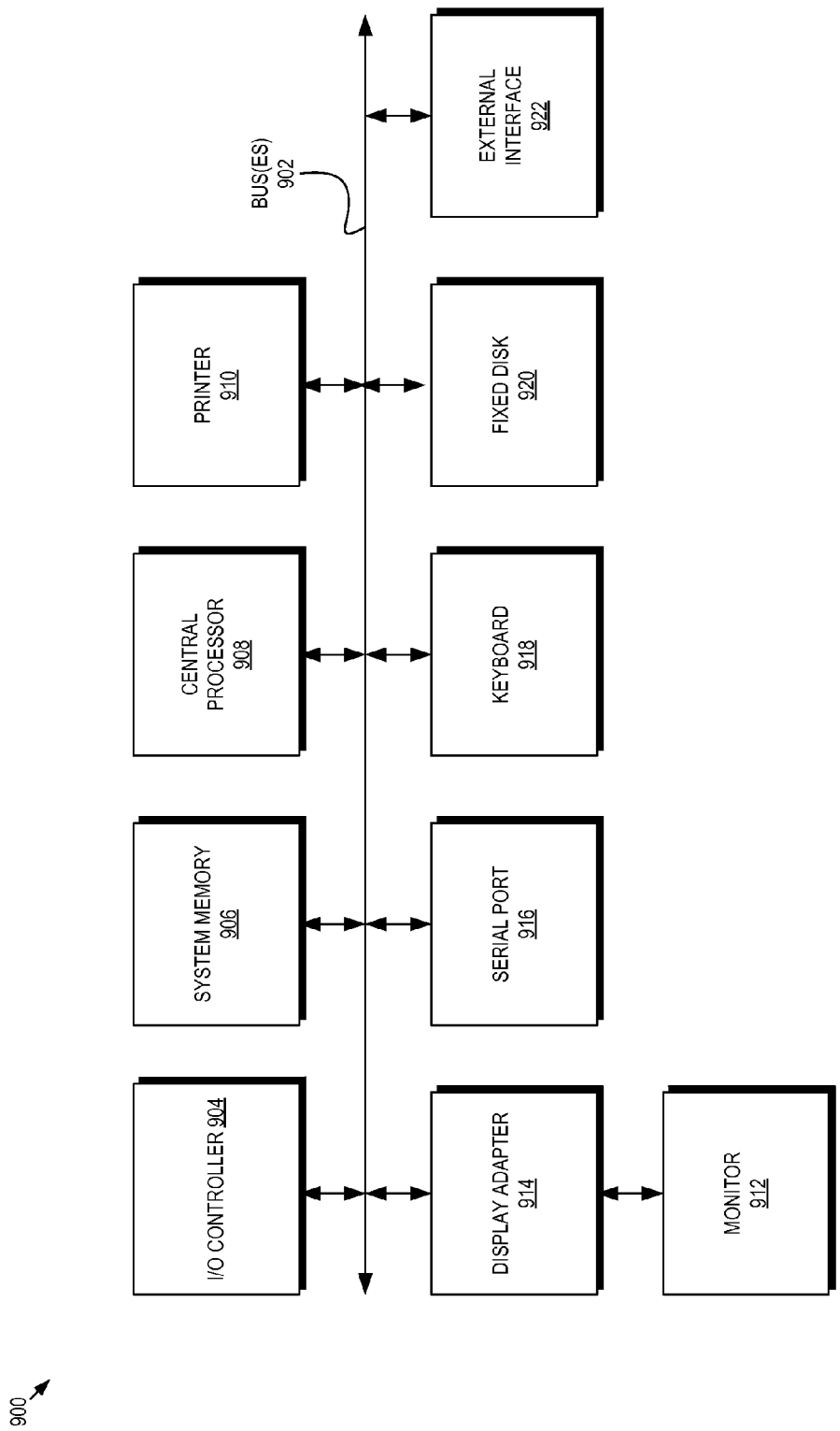
FIG. 9 illustrates a high level block diagram of a computer system that may be used to implement any of the entities or components described herein.

FIG. 9 illustrates a high level block diagram of a computer system that may be used to implement any of the entities or components described herein. The subsystems shown in FIG. 9 are interconnected via a system bus 902. Additional subsystems include a printer 910, keyboard 918, fixed disk 920, and monitor 912, which is coupled to display adapter 914. Peripherals and input/output (I/O) devices, which couple to I/O controller 904, can be connected to the computer system by any number of means known in the art, such as a serial port. For example, serial port 916 or external interface 922 can be used to connect the computer apparatus to a wide area network such as the Internet, a mouse input device, or a scanner. The interconnection via system bus 902 allows the central processor 908 to communicate with each subsystem and to control the execution of instructions from system memory 906 or the fixed disk 920, as well as the exchange of information between subsystems. The system memory 906 and/or the fixed disk may embody a computer-readable medium.

As described, the inventive service may involve implementing one or more functions, processes, operations or method steps. In some embodiments, the functions, processes, operations or method steps may be implemented as a result of the execution of a set of instructions or software code by a suitably-programmed computing device, microprocessor, data processor, or the like. The set of instructions or software code may be stored in a memory or other form of data storage element which is accessed by the computing device, microprocessor, etc. In other embodiments, the functions, processes, operations or method steps may be implemented by firmware or a dedicated processor, integrated circuit, etc.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components or functions described in this application may be implemented as software code to be executed by a processor using any suitable computer language such as, for example, Java, C++ or Perl using, for example, conventional or object-oriented techniques. The software code may be stored as a series of instructions, or commands on a computer-readable medium, such as a random access memory (RAM), a read-only memory (ROM), a magnetic medium such as a hard-drive or a floppy disk, or an optical medium such as a CD-ROM. Any such computer-readable medium may reside on or within a single computational apparatus, and may be present on or within different computational apparatuses within a system or network.

While certain exemplary embodiments have been described in detail and shown in the accompanying drawings, it is to be understood that such embodiments are merely illustrative of and not intended to be restrictive of the broad invention, and that this invention is not to be limited to the specific arrangements and constructions shown and described, since various other modifications may occur to those with ordinary skill in the art.

For ease understanding, dashed lines and/or bracketed text have been used in the figures to assist in the clarity of this description, and may signify the optional nature of some items (e.g., features not used by a given implementation of the invention; features supported by a given implementation, but used in some situations and not in others). Of course, other elements that are not dashed or bracketed herein may be optional in some embodiments, which may be obvious to those of skill in the art.

As used herein, the use of "a", "an" or "the" is intended to mean "at least one", unless specifically indicated to the contrary.

What is claimed is:

1. A method in a secure module executing on a computing device with an operating system, comprising:
  causing, by the secure module, a user interface to be presented to a user by providing obfuscated user interface data to the operating system that does not reveal meaningful elements that are part of the user interface;

receiving, by the secure module from the operating system, a notification that the user has provided an input value via the user interface to the computing device, wherein the notification does not include the input value and the operating system is not aware of the input value;

responsive to said receiving the notification, identifying an obfuscated user input value that represents the input value;

de-obfuscating, by the secure module, the obfuscated user input value to yield the input value;

receiving, by the secure module, one or more additional notifications that data representing the input value has been processed by one or more respective software or hardware modules of the computing device; and updating, by the secure module, a measured value for information flow tracking in response to the one or more notifications, wherein the measured value identifies the one or more software or hardware modules that have processed the data representing the input value; and wherein the method further comprises after said receiving the notification that the user has provided the input value, causing, by the secure module, an updated user interface to be presented to the user by providing updated obfuscated user interface data to the operating system that does not reveal meaningful elements that are part of the updated user interface.

2. The method of claim 1, further comprising:
generating a secure connection, by the secure module with a server computing device, over another connection between the computing device and the server computing device, wherein the secure connection terminates within the secure module, and wherein the another connection terminates outside of the secure module; and transmitting, by the secure module over the secure connection to the server computing device, a message comprising the de-obfuscated input value and the measured value.

3. The method of claim 2, further comprising:
receiving, from the server computing device over the secure connection, a response message indicating a result of an authentication module executing at the server computing device attempting to authenticate the de-obfuscated input value at least based upon the measured value.

4. The method of claim 3, wherein the result indicates that at least one of the one or more software or hardware modules of the computing device that processed the data representing the input value did not process the data correctly.

5. The method of claim 1, wherein the measured value, for at least one of the one or more software or hardware modules, indicates an input provided to the respective module and an output generated by the respective module.

6. The method of claim 1, wherein:
said obfuscated user interface data provided to the operating system comprises one or more pixel values, wherein each of the one or more pixel values indicates one or more of a location, a color, and a brightness.

7. The method of claim 1, wherein:
said received obfuscated user input value comprises a coordinate of the user interface that the user interacted with to provide the input value.

8. The method of claim 7, wherein said de-obfuscating the obfuscated user input value comprises identifying, based upon the coordinate, the input value entered by the user.

9. The method of claim 1, further comprising:
receiving, from an application, a request to attain the input value from the user.

10. The method of claim 1, further comprising:
registering, by the secure module with the operating system, a request to receive user input notifications.

11. A non-transitory computer-readable storage medium storing instructions that, when executed by one or more processors of a computing device, cause the computing device to execute a secure module with an operating system and perform operations comprising:

causing, by the secure module, a user interface to be presented to a user by providing obfuscated user interface data to the operating system that does not reveal meaningful elements that are part of the user interface;

receiving, by the secure module from the operating system, a notification that the user has provided an input value via the user interface to the computing device, wherein the notification does not include the input value and the operating system is not aware of the input value;

responsive to said receiving the notification, identifying an obfuscated user input value that represents the input value;

de-obfuscating, by the secure module, the obfuscated user input value to yield the input value;

updating, by the secure module, a measured value for information flow tracking that identifies one or more software or hardware modules of the computing device that have processed data representing the input value, and wherein the measured value, for at least one of the software or hardware modules, indicates an input provided to the respective module and an output generated by the respective module; and wherein the operations further comprise:
after said receiving the notification that the user has provided the input value, causing, by the secure module, an updated user interface to be presented to the user by providing updated obfuscated user interface data to the operating system that does not reveal meaningful elements that are part of the updated user interface.

12. The non-transitory computer readable storage medium of claim 11, wherein the operations further comprise:
generating a secure connection, by the secure module with a server computing device, over another connection between the computing device and the server computing device, wherein the secure connection terminates within the secure module, and wherein the another connection terminates outside of the secure module; and transmitting, by the secure module over the secure connection to the server computing device, a message comprising the de-obfuscated input value and the measured value.

13. The non-transitory computer readable storage medium of claim 11, wherein:
said obfuscated user input value comprises a coordinate of the user interface that the user interacted with to provide the input value; and said de-obfuscating the obfuscated user input value comprises identifying, based upon the coordinate, the input value entered by the user.

14. A computing device, comprising:
one or more processors;
a user-input hardware interface coupled to the one or more processors; and
a non-transitory computer readable storage medium, coupled to the one or more processors, which store instructions that, when executed by the one or more processors, cause the computing device to execute a secure module with an operating system and perform operations comprising:
   causing, by the secure module, a user interface to be presented to a user by providing obfuscated user interface data to the operating system that does not reveal meaningful elements that are part of the user interface;
   receiving, by the secure module from the operating system, a notification that the user has provided an input value via the user interface to the computing device, wherein the notification does not include the input value and the operating system is not aware of the input value;
   responsive to said receiving the notification, identifying an obfuscated user input value that represents the input value;
   de-obfuscating, by the secure module, the obfuscated user input value to yield the input value;
   updating, by the secure module, a measured value for information flow tracking that identifies one or more software or hardware modules of the computing device that have processed data representing the input value, and
   wherein the measured value, for at least one of the software or hardware modules, indicates an input provided to the respective module and an output generated by the respective module, and wherein the operations further comprise
after said receiving the notification that the user has provided the input value,
   causing, by the secure module, an updated user interface to be presented to the user by providing updated obfuscated user interface data to the operating system that does not reveal meaningful elements that are part of the updated user interface.

15. The computing device of claim 14, wherein the operations further comprise:
   generating a secure connection, by the secure module with a server computing device, over another connection between the computing device and the server computing device, wherein the secure connection terminates within the secure module, and wherein the another connection terminates outside of the secure module; and
   transmitting, by the secure module over the secure connection to the server computing device, a message comprising the de-obfuscated input value and the measured value.

16. The computing device of claim 14, wherein:
   said obfuscated user input value comprises a coordinate of the user interface that the user interacted with to provide the input value; and
   said de-obfuscating the obfuscated user input value comprises identifying, based upon the coordinate, the input value entered by the user.

17. A method in a secure module executing on a computing device with an operating system, comprising:
   receiving, at the secure module, an obfuscated user input value generated by a user providing an input value to the computing device, wherein the obfuscated user input value does not reveal the input value and the operating system is not aware of the input value;
   de-obfuscating, by the secure module, the obfuscated user input value to yield the input value;
   receiving, by the secure module, one or more notifications that data representing the input value provided to the computing device by the user has been processed by one or more respective software or hardware modules of the computing device; and
   updating, by the secure module, a measured value for information flow tracking in response to the one or more notifications, wherein the measured value identifies the one or more software or hardware modules that processed the input value, and
wherein the method further comprises
after said receiving the obfuscated user input value,
   causing, by the secure module, an updated user interface to be presented to the user by providing updated obfuscated user interface data to an operating system that does not reveal meaningful elements that are part of the updated user interface.

18. The method of claim 17, further comprising:
transmitting, through a secure tunnel, the input value and the measured value to a remote server device for the input value to be validated at least partially based upon the measured value.

19. The method of claim 18, further comprising:
transmitting, through the secure tunnel, a heartbeat message according to a defined schedule to indicate, to the remote server device, that the secure module remains functional.

20. The method of claim 19, further comprising:
responsive to failing to transmit one or more heartbeat messages according to the defined schedule, determining that the remote server device has terminated the secure tunnel.

21. The method of claim 17, wherein the measured value, for at least one of the one or more software or hardware modules, indicates an input provided to the respective module and an output generated by the respective module.

* * * * *